United States Patent
Kwok et al.

(10) Patent No.: US 12,514,661 B2
(45) Date of Patent: Jan. 6, 2026

(54) ROBOTIC PLATFORM TO NAVIGATE MRI-GUIDED FOCUSED ULTRASOUND SYSTEM

(71) Applicant: THE UNIVERSITY OF HONG KONG, Hong Kong (HK)

(72) Inventors: Ka Wai Kwok, Hong Kong (HK); Zhouliang He, Hong Kong (HK); Jing Dai, Hong Kong (HK); Ge Fang, Hong Kong (HK); Xiaomei Wang, Hong Kong (HK)

(73) Assignee: The University of Hong Kong, Hong Kong (CN)

( * ) Notice: Subject to any disclaimer, the term of this patent is extended or adjusted under 35 U.S.C. 154(b) by 150 days.

(21) Appl. No.: 18/548,322

(22) PCT Filed: Mar. 9, 2022

(86) PCT No.: PCT/CN2022/079908
§ 371 (c)(1),
(2) Date: Aug. 29, 2023

(87) PCT Pub. No.: WO2022/188800
PCT Pub. Date: Sep. 15, 2022

(65) Prior Publication Data
US 2024/0180648 A1    Jun. 6, 2024

Related U.S. Application Data

(60) Provisional application No. 63/168,876, filed on Mar. 31, 2021, provisional application No. 63/159,392, filed on Mar. 10, 2021.

(51) Int. Cl.
*A61B 34/35* (2016.01)
*A61B 17/00* (2006.01)
(Continued)

(52) U.S. Cl.
CPC .............. *A61B 34/35* (2016.02); *A61B 17/00* (2013.01); *A61B 90/37* (2016.02); *A61N 7/02* (2013.01);
(Continued)

(58) Field of Classification Search
CPC ......... A61B 34/35; A61B 17/00; A61B 90/37; A61B 2017/00539; A61B 2017/00544;
(Continued)

(56) References Cited

U.S. PATENT DOCUMENTS

2010/0125192 A1* 5/2010 Chopra ..................... A61N 7/02
601/2
2019/0000572 A1* 1/2019 Tse .......................... A61B 90/10
(Continued)

FOREIGN PATENT DOCUMENTS

| CN | 104815399 A | 8/2015 |
|---|---|---|
| CN | 107106124 A | 8/2017 |

(Continued)

OTHER PUBLICATIONS

Foreign Communication from a Related Counterpart Application, International Search Report and Written Opinion dated May 27, 2022, International Application No. PCT/CN2022/079908 filed on Mar. 9, 2022.

*Primary Examiner* — Kaitlyn E Sebastian
(74) *Attorney, Agent, or Firm* — Leason Ellis LLP

(57) ABSTRACT

A robot that is used to move a transducer of an MRI-guided focused ultrasound (FUS) system that can focus ultrasound at specific target spots in a patient's body to induce micromechanical effects. The robot has a bottom framework, a lower translation platform mounted on the bottom framework for linear motion with respect to the bottom framework. A robot base mounted on the lower translation platform, a rotation platform mounted on the robot base for
(Continued)

rotational motion with respect to the robot base, an upper translation platform mounted on the rotation platform for linear motion with respect to the robot base and an end-effector mounted on the upper translation platform and supporting the FUS transducer such that motion of the end-effector is due to motion of the platforms while aiming the transducer focal point.

19 Claims, 27 Drawing Sheets

(51) Int. Cl.
  *A61B 90/00* (2016.01)
  *A61N 7/02* (2006.01)
  *A61B 34/30* (2016.01)
  *A61N 7/00* (2006.01)

(52) U.S. Cl.
  CPC ............... *A61B 2017/00539* (2013.01); *A61B 2017/00544* (2013.01); *A61B 2034/304* (2016.02); *A61B 2090/374* (2016.02); *A61N 2007/0091* (2013.01); *A61N 2007/0095* (2013.01)

(58) Field of Classification Search
  CPC ........ A61B 2034/304; A61B 2090/374; A61B 34/30; A61N 7/02; A61N 2007/0091; A61N 2007/0095
  See application file for complete search history.

(56) References Cited

U.S. PATENT DOCUMENTS

| | | | |
|---|---|---|---|
| 2019/0059932 A1 | 2/2019 | Isosaki et al. | |
| 2020/0046450 A1* | 2/2020 | Tsao | F15B 7/00 |
| 2023/0008673 A1* | 1/2023 | Park | A61N 7/02 |

FOREIGN PATENT DOCUMENTS

| | | |
|---|---|---|
| CN | 109259822 A | 1/2019 |
| CN | 111603303 A | 9/2020 |
| WO | 2020041801 A1 | 2/2020 |
| WO | 2022188800 A1 | 9/2022 |

* cited by examiner

*FIG. 3A*
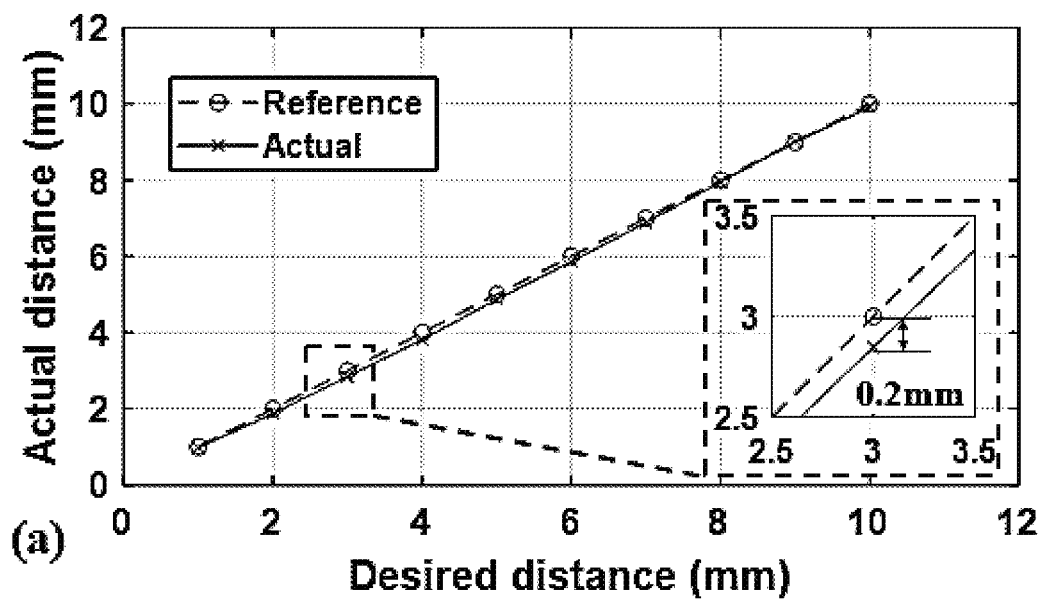
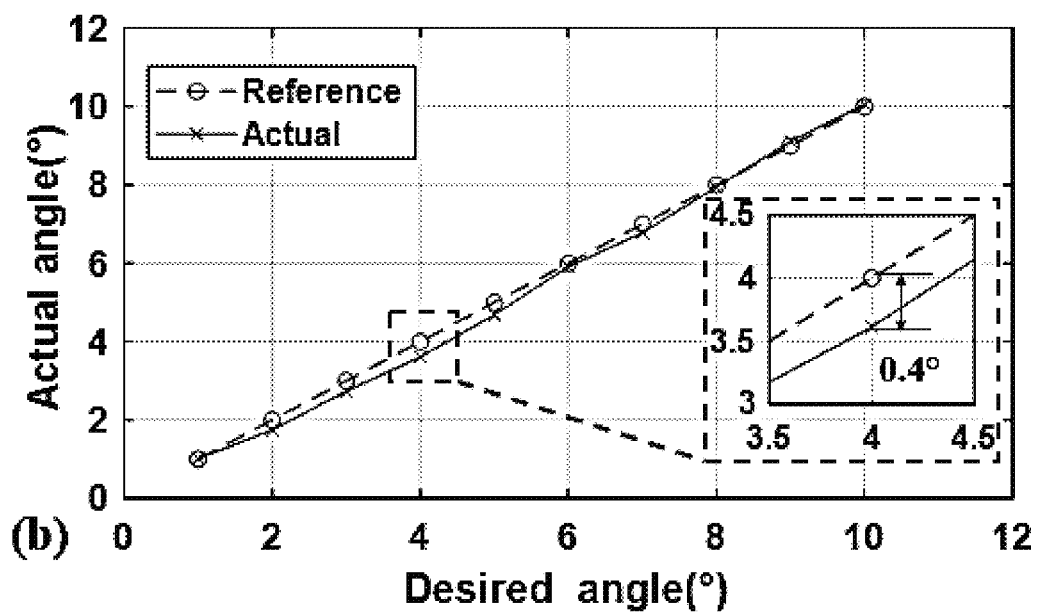
*FIG. 3B*

ROBOTIC PLATFORM TO NAVIGATE MRI-GUIDED FOCUSED ULTRASOUND SYSTEM

CROSS-REFERENCE TO RELATED APPLICATIONS

The present application is a filing under 35 U.S.C. 371 as the National Stage of International Application No. PCT/CN2022/079908, filed Mar. 9, 2022, entitled "A Robotic Platform to Navigate MRI-guided Focused Ultrasound System," which claims priority to U.S. Application No. 63/159,392 filed with the United States Patent and Trademark Office on Mar. 10, 2021; and U.S. Application No. 63/168,876 filed with the United States Patent and Trademark Office on Mar. 31, 2021; each and every of which are incorporated herein by reference in their entirety for all purposes.

FIELD OF THE INVENTION

The present invention generally relates to the field of focused ultrasound (FUS) technology guided by feedback from magnetic resonance imaging (MRI), for location of a static or moving ablation target, and positioning of the FUS. In particular, the invention relates to the field of robotic devices or robotic platforms for moving FUS devices in response to feedback from MRI.

BACKGROUND OF THE INVENTION

Focused ultrasound (FUS) is a technology that focuses ultrasound or ultrasonic waves onto a specific target point inside a living body to induce micro-mechanical effects in that point. This creates a localized point of ablation which can kill unwanted tissues. The FUS procedure can be painless, non-invasive and extracorporeal, without any resultant surgical scar. One particular type of FUS is known as high intensity focused ultrasound (HIFU) which is used to ablate tumors in the prostate, uterus and liver, and so on.

FIG. 1L illustrates how FUS is used to treat liver tumors. A patient is shown in FIG. 1L lying in a prone position on a treatment bed. The part of the patient to be treated by FUS is placed over a hole in the bed, and into contact with a sealed water tank through the hole. An FUS transducer for emitting ultrasonic waves is contained inside the water tank, which is filled with degassed water for ultrasound transmission.

The part of the patient to receive FUS therapy is called the region of interest (RoI), which is the part placed onto the water tank through the hole in the bed. In some cases, the area of the RoI is much larger than the focal region of the FUS transducer. Therefore, FUS technology is not easily applied on an RoI as large as areas of organs such as the liver in abdominopelvic region. To treat multiple tumors spread over a large RoI area, the most straightforward way to get at every tumor is to move a FUS transducer manually over the entire RoI, in discrete sessions. However, this is time-consuming and involves tedious re-positioning of the transducer and the patient.

To reduce the need to move the FUS transducer manually, it has been proposed to use software to adjust the focal point of the ultrasonic waves emitted by the FUS transducer. In this method, ultrasonic waves are produced by a phased array of ultrasound transducers, arranged on an ultrasound transducer holder. The phase of the ultrasonic wave produced by each transducer in the aperture array (<Ø18 cm) can be independently adjusted. The focal point of the ultrasonic waves can be moved by changing the parameters of each transducer, i.e. the phase and perhaps also the amplitude, without moving the holder. Such phased-array transduction enables dexterous control of the acoustic beam direction and geometry. Advantageously, as patients move involuntarily as they breath and fidget on the treatment bed, this method can be used to move the focal point of the FUS along with any minor displacement of the target tumor. Furthermore, it has been proposed to use live-imaging technology and image recognition technology to lock-in onto the target tumor. Any displacement of the tumor can be detected and fed back to the software, so that the focal point of the ultrasonic waves can be re-positioned immediately onto the moved tumor. One of these imaging techniques is the MRI (magnetic resonance imaging) technology.

However, changing the parameters of the ultrasonic waves can only move the focal point within a limited range, at typically <3.5 cm within the focal plane. This is insufficient to cover a relatively large treatment area, such as the liver in the abdominopelvic region. Furthermore, the organs in the abdominopelvic region tend to move regularly in every possible direction, requiring an even larger workspace.

To improve the ability of the FUS to follow a moving target, it has been proposed to use robotic navigation based on intra-operative (intra-op) images feedback to tele-manipulate the position of the ultrasonic transducer holder. To offer such intra-op image guidance with promising soft-tissue image contrast and high-resolution HIFU temperature monitoring, MRI has been widely adopted, namely magnetic resonance (MR)-guided FUS (MRg-FUS). In particular, it has been proposed to use a long robotic arm to enlarge the treatment region (500 mm translation and 40° rotation) for biopsy and to apply FUS treatment to the prostate. However, such a long arm has to be fixed outside the bore of the MRI scanner.

Therefore, for coordinating FUS access and intra-op MRI guidance for abdominopelvic organs therapy, it has been proposed to place the robot underneath the prone-position patient (just as that shown in FIG. 1L). The robot, bearing a holder for an array of ultrasonic transducer, is placed entirely within a sealed water tank (around 275×275×240 mm). Thus, the robot has to be compact in size, but also capable of providing large-range manipulation of transducers. Very few of the table-embedded robotic systems are commercially available especially for abdominal FUS treatment. Sonalleve MRg-FUS system (Philips) and ExAblate 2000 (Insightec) are commercial MRg-FUS robotic systems, which were primarily developed for pelvic organ disease treatment (e.g. uterine fibroids tumors).

Unlike the stationary targets in pelvic FUS treatment, it will be challenging for abdominal FUS treatment, where fast focal spot tracking (>0.2 Hz) is a mandatory prerequisite due to the rapid respiratory-induced motion. Platforms from MEDSONIC LTD (Cyprus) are featured with two translational degrees of freedom (DoFs), and are predominantly produced for abdominal HIFU. However, such 2-axis design only allows for motion in the coronal plane, which may restrict its capability of compensating 3D respiratory-induced target motion.

Although capable of accurate positioning within a sufficient steering range, most existing table-embedded systems are typically only applicable for low intensity FUS (e.g. hyperthermia). While taking account of skin burn circumvents, the HIFU sonication would have to be paused frequently to ensure adequate "cool down" of the heated skin area. It has been hypothesized that a robotic platform should flexibly rotate the transducer in a certain large angular range so as to reduce heat accumulation while fixing the focal spot. Therefore, their design without rotation may hamper the efficacy and cause skin burn (FIG. 11).

To ensure a safe actuation for FUS robotic systems under (intra-op) MR environment while minimizing the interferences, various MR-conditional/MR-safe actuators were adopted, such as piezoelectric and ultrasonic actuators in gynecological tumors treatments. However, the high-frequency current exciting the stepper motor action may induce significant artifacts in intra-op imaging, as the robot placed underneath the patient's abdomen would be very close (<150 mm) to the isocenter of MRI scanner. Inherently MR safe motors powered by fluid, e.g. pneumatic motors, have also been discussed. InnoMotion (InnoMedic GmbH) is a commercially available platform for biopsies and facet joint treatments, fully driven by pneumatic stepper motors. However, the high compressibility of air may cause mechanical transmission delay and thus control inaccuracies. The hydraulic system is accomplished with incompressible fluid as the transmission media, offering quick response, accurate control and high-power density. MRg-FUS navigation with conventional piston-cylinder actuation has been reported since the 1990s; however, those systems only achieved a maximum 3-DoF manipulation, causing an insufficient steering range with the absence of pan-and-tilt movement.

SUMMARY OF THE INVENTION

In order to overcome the limitations of the prior art, the present invention proposes a tele-operated robot platform for MRg-FUS treatment in abdominopelvic organs. The custom-made hydraulic robot actuation can ensure low transmission latency (100 ms on average under 4.5 Hz) and high tracking accuracy (0.2 mm in translation, 0.4° in rotation), and MR-safety under the terms of ASTM F2503-13. The robot setting allows the patient to lie in prone position. Its sufficient DoFs enables the focal spot to be adjustable in a large volume inside the patient's body. Key features of some embodiments of the invention may include:
1) Hydraulic actuation design of a 5-DoFs robot platform to navigate an MRg-FUS system for abdominopelvic organ disease treatment, empowering the foci to be steered in a wide spatial coverage of major abdominal or pelvic organs.
2) Compact design of robot (240×180×190 mm) capable of being accommodated in the water tank inside the MRI operating table for patient prone position.
3) Experimental evaluation of positional accuracy (max. error: 0.2 mm in translation, 0.4° in rotation), frequency response (0.1-4 Hz), MR-safety, and MR-based tracking features, thus demonstrating its potential for respiratory motion compensation.

Accordingly, the invention provides a possible advantage that the FUS transducer can be used to follow the movements of the target point in the patient's body. Displacements of the target tissue caused by respiration, intestinal movements and natural fidgeting can happen in any direction. The ability of the robot base to both translate the FUS transducer and to tilt the FUS transducer provides the ability to follow the displacements very closely. This prevents the surrounding tissue from being ablated by mistake.

Furthermore, the invention provides the possibility of moving the FUS transducer about the surface of the human body, while the focal point remains locked onto the target point. This provides that the point of penetration is movable and spread over a larger surface area to prevent skin burn (FIG. 11).

To be more specific, the robotic platform is able to flexibly rotate the transducer in a certain large angular range so as to reduce skin heat accumulation while fixing the focal spot on the lesion target. It avoids the need for regular cooling in the long run. To prevent skin-burn injury, two decoupled rotation DoFs, pan-tilt, are coordinated with the translation of transducers. In a first aspect, the invention proposes an MRI-guided focused ultrasound (FUS) positioning system that can focus ultrasound from a FUS transducer towards specific targets in a patient's body to induce micro-mechanical effects, said system including: an MRI-compatible robot platform that provides multiple degrees of freedom (DoFs) of motion, comprising: a bottom framework; a lower translation platform mounted on the bottom framework for linear motion with respect to the bottom framework; a robot base mounted on the lower translation platform; a rotation platform mounted on the robot base for rotational motion with respect to the robot base; an upper translation platform mounted on the rotation platform for linear motion with respect to the rotation platform; and an end-effector mounted on the upper translation platform such that motion of the end-effector is due to motion of the lower, rotation and upper platforms, in aiming the transducer focal point; at least one actuator connected to the robot platform to cause the system to move according to at least one of its DoFs, a FUS transducer provided on the end effector to generate ultrasound energy with a focal point, which transducer can be steered electronically by adjusting the phase of the transducer or mechanically by moving the robot platform; at least one marker embedded in the end-effector that provides signals that allow registration and tracking of the end-effector in the MRI coordinate system; and a control system for remotely controlling the motions of the robot platform and for receiving intra-op MRI data.

The provision of the DoFs provide the possibility of using software to adjust the specific target, so that if the specific target moves such as when the patient breathe or fidget, the robot platform is able to move the FUS transducer along with the movement of the target.

Preferably, the lower translation platform provides 2 DoFs linear motion in perpendicular directions with respect to the bottom framework; the rotation platform provides 2 DoFs rotational motion in perpendicular directions with respect to the robot base; the upper translation platform provides 1 DoF linear motion with respect to the rotation platform.

Preferably, the invention is suitable for directing focused ultrasound within the abdominal and pelvic cavities of the human body to treat abdominopelvic organ diseases.

Preferably, the treatment is at least one of tumor ablation, drug delivery, targeted gene therapy and thrombolysis.

Preferably, the motion of the system caused by the actuator is at least one of forward-backward, left-right, up-down, pan, and tilt.

Preferably, the motion is driven by at least one of pneumatic and hydraulic actuation, causing zero EM interference, enhancing MR imaging quality and tracking performance of the marker(s). Preferably, the motion of the transducer is achieved using rolling-diaphragm-sealed hydraulic actuators.

Preferably, the robot platform is immersed and operated inside a tank of degassed liquid that couples the transducer to the patient body.

Preferably, the sealed tank with degassed liquid is integrated inside the MRI table.

Preferably, the transducer couples to the patient body by an intermediate liquid container attached to a gel pad.

Preferably, each DoF of the robot platform moves independently or simultaneously to achieve a remote center of motion (RCM) about the ultrasound focal point, reducing the exposure time of a particular skin region to ultrasound energy.

Preferably, the hydraulic actuation offers a high payload capability and high responsiveness even when the robot platform is immersed in liquid or supporting a liquid container on top of the transducer.

Preferably, the bandwidth of the hydraulic actuation reaches 4.5 Hz, and a moving speed of 90 mm/s for each DoF of the upper and lower translation platform, allowing physiological motion compensation during treatment, reducing the operation time.

Preferably, the FUS is high intensity focused ultrasound (HIFU) or low intensity focused ultrasound (LIFU).

Preferably, the treatment of abdominopelvic organ diseases is achieved by steering the ultrasound to ablate large or multiple tumors of an organ such as the liver.

Preferably, the workspace of the FUS focal point is large enough to carry out targeting to multiple or large targets.

Preferably, the workspace for ultrasound focal point mechanical steering is 100×100×35 mm or greater.

Preferably, the stroke of each DoF of the upper and lower translation is ±35 mm, and the stroke for each DoF of the rotation platform is ±60°.

Preferably, the motion error is not greater than 0.2 mm in translation and 0.4° in rotation.

Preferably, the control system utilizes at least one marker to provide closed-loop control.

In a further aspect, the invention proposes an MRI-compatible robot platform that provides multiple degrees of freedom (DoFs) of motion, comprising: a bottom framework; a lower translation platform mounted on the bottom framework for linear motion with respect to the bottom framework; a robot base mounted on the lower translation platform; a rotation platform mounted on the robot base for rotational motion with respect to the robot base; an upper translation platform mounted on the rotation platform for linear motion with respect to the rotation platform; and an end-effector mounted on the upper translation platform such that motion of the end-effector is due to motion of the lower, rotation and upper platforms, in aiming the transducer focal point; a FUS transducer provided on the end effector to generate ultrasound energy with a focal point, and motion of the end effector results in aiming the transducer focal point; at least one marker embedded in the end-effector that provides signals that allow registration and tracking of the location of the end-effector; and wherein the robot platform is adapted to receive a signal for at least one actuator that causes the platform to move according to at least one of its DoFs.

Preferably, the lower translation platform provides 2 DoFs linear motion in perpendicular directions with respect to the bottom framework; the rotation platform provides 2 DoFs rotational motion in perpendicular directions with respect to the robot base; the upper translation platform provides 1 DoF linear motion with respect to the rotation platform.

In a further aspect, the invention proposes a method of treating a target in a patient's body to induce micro-mechanical effects, comprising the steps of: transmitting ultrasound from an FUS transducer into the body; focusing the transmitted ultrasound onto the target; moving the FUS transducer across the surface of the body while continuing to focus the transmitted ultrasound onto the target.

Accordingly, the method provides the possibility that no part of the surface of the body is burnt or uncomfortably heated while the target is being treated continually. This improves the efficiency of each treatment session, and obviates the problem in the prior art of having to let the surface of the body cool in the middle of each treatment session.

Preferably, the step of moving the FUS transducer across the surface of the body comprises: moving the FUS transducer in a circular motion over the surface of the body.

Typically, the FUS transducer is tilted towards the target; and the step of moving the FUS transducer across the surface of the body further comprises: varying the tilt of the FUS transducer such that the FUS transducer is continuously adjusted to tilt towards the target as the FUS transducer is being moved across the surface of the body.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 3A is a graph showing the results of a robot positioning accuracy test in one direction, with the translation along x-axis and FIG. 3B is a graph showing rotation along x-axis;

FIG. 4 illustrate experimental results of frequency response, where

DETAILED DESCRIPTION OF AN EMBODIMENT

Figure 1A:
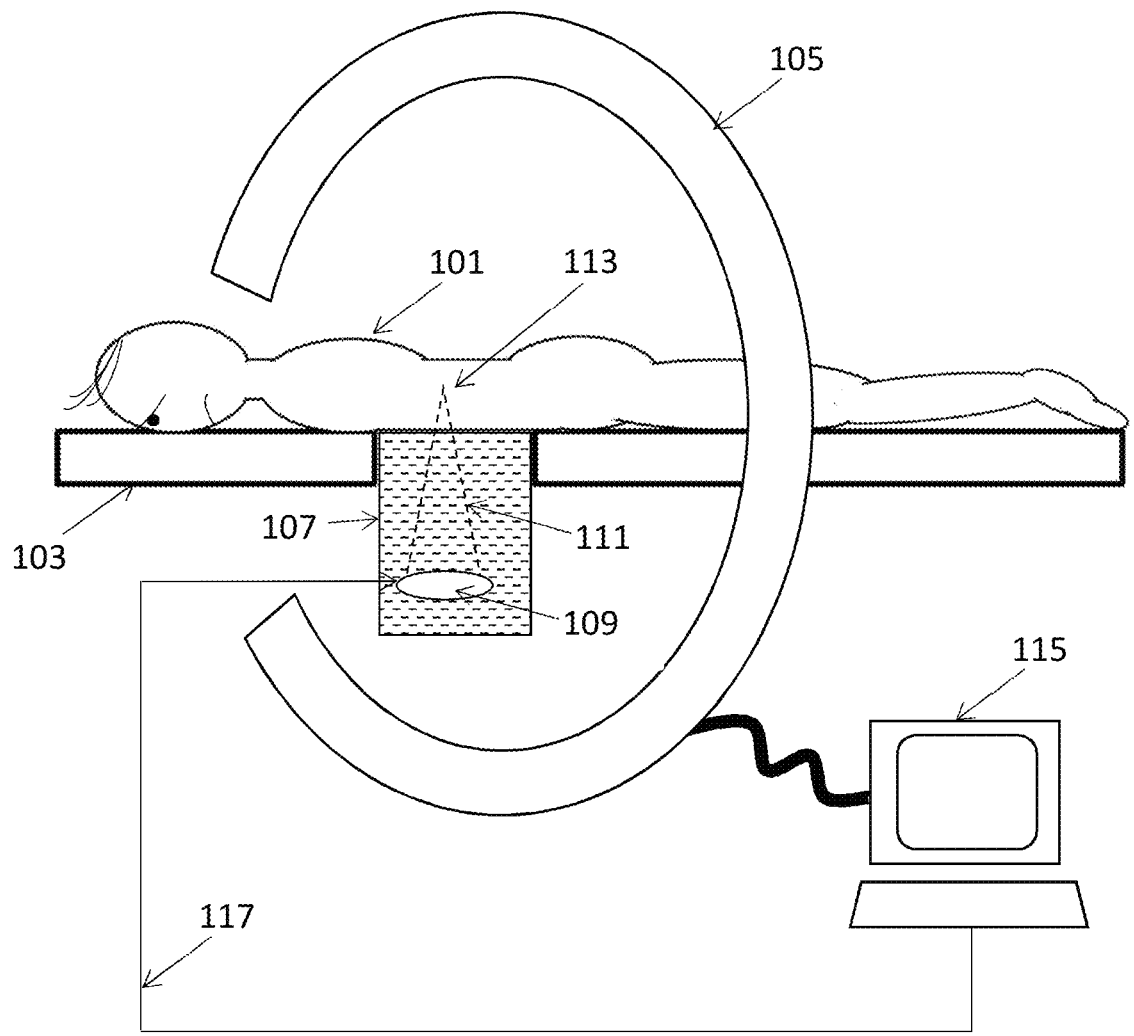
FIG. 1A illustrates schematically an MRI machine that can be used with an embodiment of the invention.

FIG. 1A illustrates schematically a patient 101 lying face down on a treatment bed 103 inside an MRI machine 105. The treatment bed has an opening where the patient 101's abdominopelvic region is exposed to contact a water tank 107 beneath the patient 101.

Figure 2A:
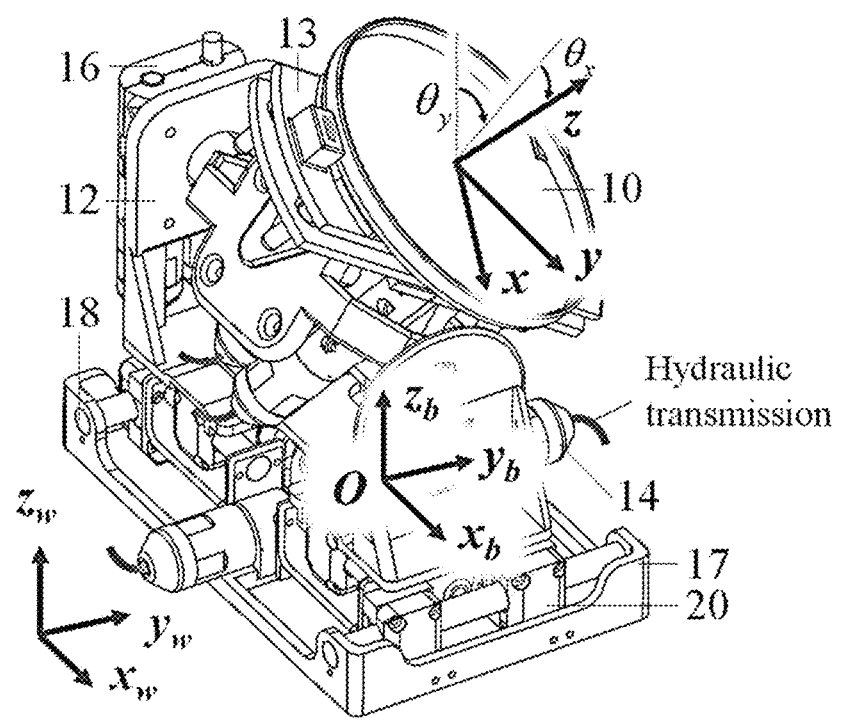
FIG. 2A illustrates an MRI-guided robotic manipulator for ultrasound transducer array positioning, with 3 translation DoFs and 2 rotation DoFs.

Inside the water tank 107 is submerged an ultrasound transducer holder 109 and the embodiment in degassed water, which is a movable robot base (not illustrated in FIG. 1A, see FIG. 2A). The ultrasound transducer holder 109 is located on an end-effector 10 (FIG. 2A) which is supported on the robot base. An array of ultrasound transducers (not illustrated) are arranged on the ultrasound transducer holder 109. Each of these ultrasound transducers can be adjusted individually by software such that the overall ultrasound waves 111 emitted by the ultrasound transducers converge onto a focal point 113 inside the patient 101. The water in the tank 107 provides the medium for transmitting the ultrasound waves into the patient 101. The robot base is capable of moving the ultrasound transducer holder 109 in a horizontal plane (panning), tilting the ultrasound transducer holder 109 about two horizontal and mutually orthogonal axes, and also raising the ultrasound transducer holder 109 vertically.

During treatment of the patient 101, the MRI machine operates continuously to generate a real-time image of the organs inside the patient 101 on a monitor 115. A dynamic image of the target point 113, which can be a tumor, is created by the MRI machine. Software operating on a suitable computer is used to recognize the tumor, and providing feedback 117 on movements or displacements of the tumor to 1) adjust the position of the robot base and/or 2) to move the focal point of the ultrasound waves emitted from the ultrasound transducers (also known as electronic steering). In this way, the software can use either one of options 1) and 2), or a combination of both 1) and 2), to follow the tumor.

Typically, if the tumor is just raised or lowered over the FUS transducer vertically, which can be caused by abdominal movement as part of respiration, the phase of the ultrasound waves from the transducers can be changed so that the focal point is moved up or down along with the tumor.

Accordingly, the robot base provides the possibility that only the tumor is treated. Surrounding issues are not accidentally ablated. This is because the robot base provides great flexibility and accuracy in following the displacements of the tumor.

All the components of the ultrasound transducer holder 109 and the robot base are made of material that does not disrupt the operations of the MRI. In particular, none of the components comprise metal. Preferably, all movements of the robot base are provided by hydraulics or pneumatic pistons. In contrast, motor-driven movements are unsuitable as motors tend to comprise metal parts, which interfere with the operation of the MRI machine. However, hydraulics based operation of the robot base is preferred over pneumatics for smoother and finer robotic movements, as compress air is compressible under pressure and therefore could lead to jerky movements.

Figure 1B:
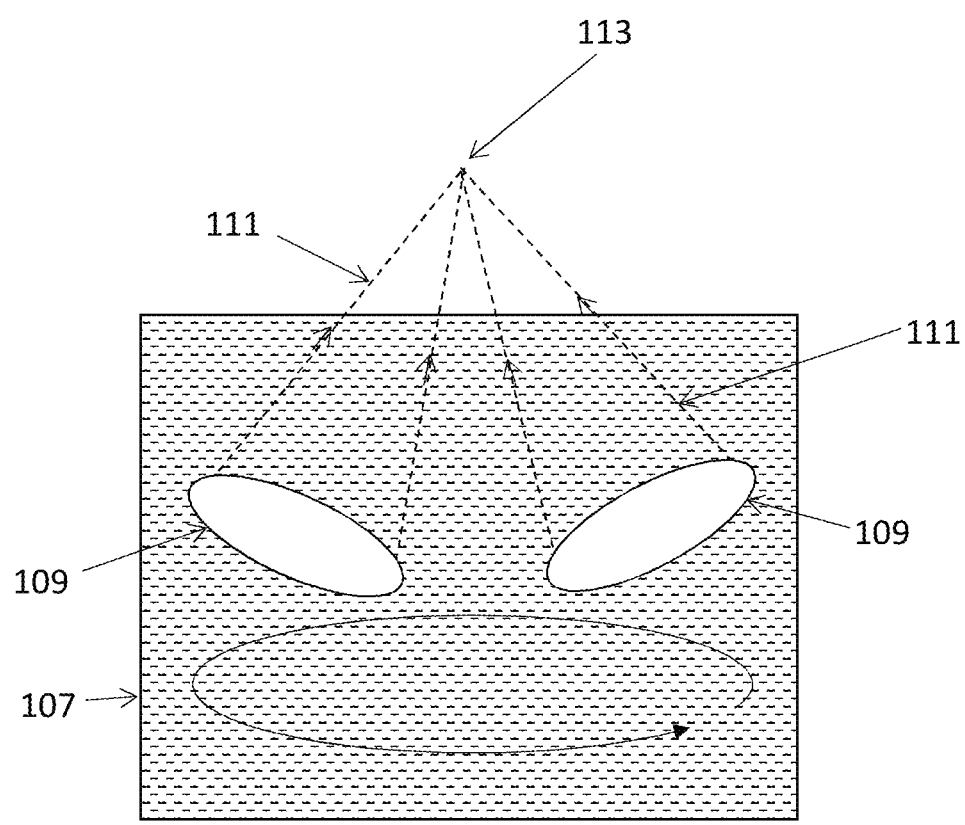
FIG. 1B illustrates possible movements of the embodiment used with the MRI machine as shown in FIG. 1A.

FIG. 1B illustrates an enlarged view of the sealed water tank 107, showing circular movements of the ultrasound transducer holder 109 inside. The robot base that moves the ultrasound transducer holder 109 is not illustrated here. The drawing shows how the ultrasound transducer holder 109 is moved continuously during ablation of a target point 113. The focal point of the ultrasound remained fixed onto the target point 113 and does not change despite the revolving movements of the ultrasound transducer holder 109. However, the area of the patient 101's body through which the ultrasound waves penetrate into the patient 101 is changed continually. This reduces the likelihood of any part of the skin overheating, since the heat generated by the penetration of the ultrasound waves is shared over an enlarged area of the body. An area of the skin that the ultrasound has penetrated into and is thereby heated up may cool down when the ultrasound transducer holder 109 has moved on to another part of the abdomen, and before the revolving ultrasound transducer holder 109 returns.

As seen in FIG. 1B, the ultrasound transducer holder 109 tilts towards the target in every position on the revolution track. In other words, the target point 113 inside the abdomen remains the focal point about which the ultrasound transducer holder 109 moves.

Figure 1C:
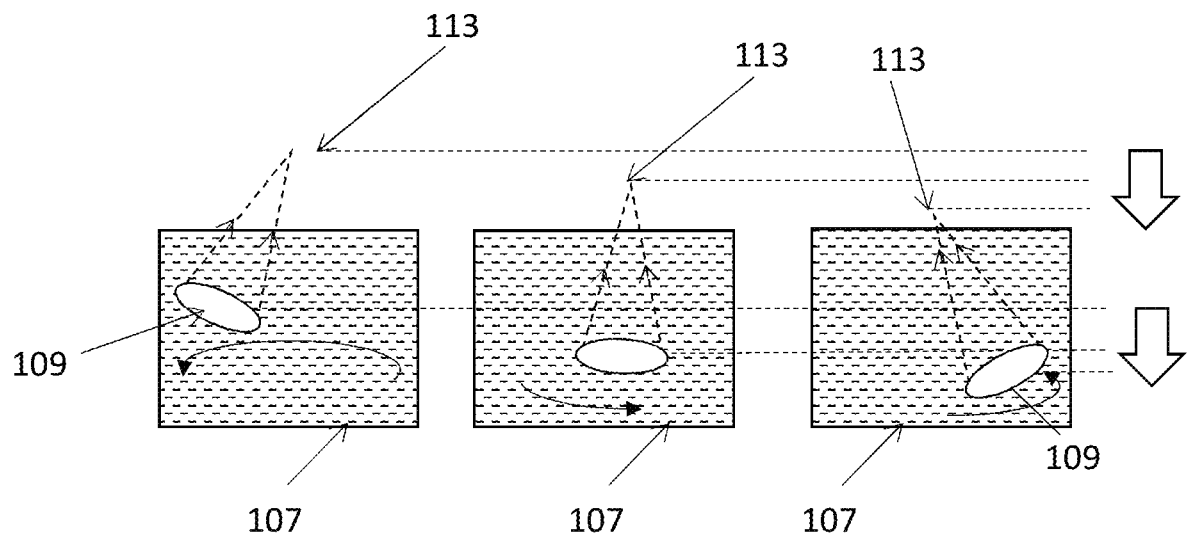
FIG. 1C illustrates one possible way of adjusting the focal point of the embodiment of FIG. 1B.

FIG. 1C shows the revolution of the ultrasound transducer holder 109 moving vertically, as well as tiling and revolving. The drawing on the left shows the ultrasound transducer holder 109 positioned higher than the ultrasound transducer holder 109 in the middle drawing, which is in turn higher than the ultrasound transducer holder 109 in the right drawing. These vertical movements are due to the controlling software moving the ultrasound transducer holder 109 in tandem with the target point 113 which might be moving up and down as the patient 101 breathes.

Figure 1D:
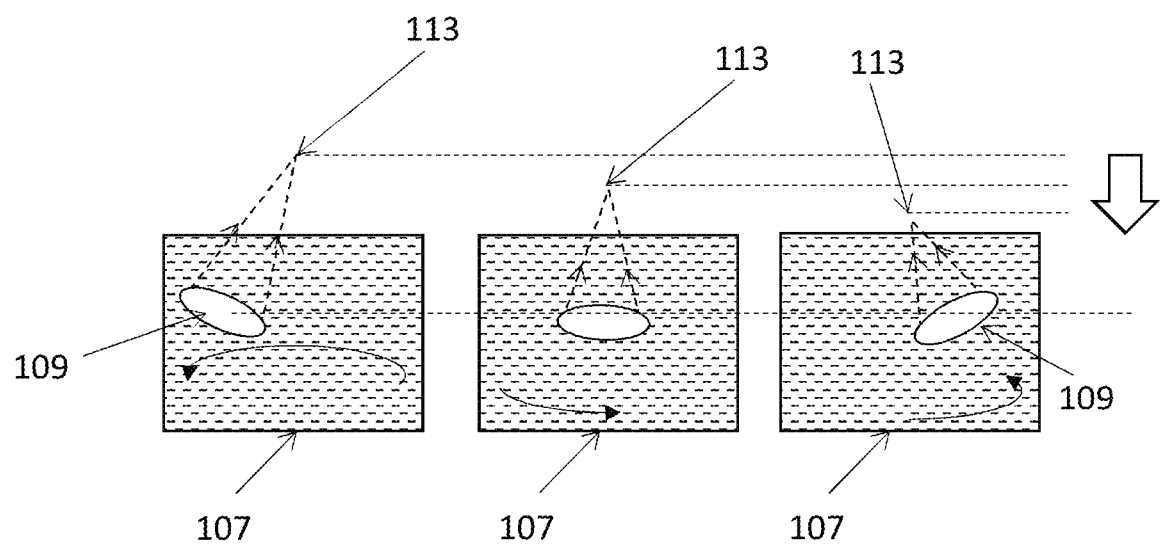
FIG. 1D illustrates another possible way of adjusting the focal point of the embodiment of FIG. 1B.

FIG. 1D shows an alternative way of changing the focus of the ultrasonic beam, in which the ultrasound transducer holder 109 is not moved vertically while revolving around the target point 113. Instead, the phases of the ultrasound waves are varied so that the focal point moves in accordance with the change in position of the target point 113.

The ultrasound transducer holder 109 is supported by a robot base such as that shown in FIG. 2A, which provides panning movements in two horizontal directions, two tilting movements about two axes which are orthogonally aligned, and elevation along an axis. These simple movements are illustrated in FIG. 1E to FIG. 1I. From the simple movements, complex, composite movements such as that shown in FIG. 1B, FIG. 1C and FIG. 1D can be constructed.

Figure 1E:
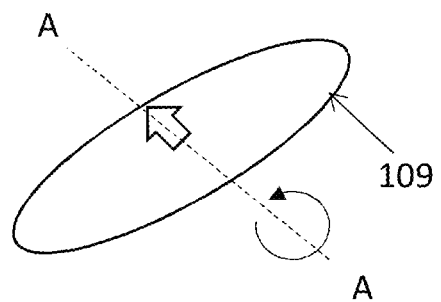
FIG. 1E illustrates an axis, the movements about which a part of the embodiment of FIG. 1B provides possibility.

FIG. 1E illustrates that the ultrasound transducer holder 109 is capable of being tilted about a horizontal axis AA. The solid white arrow marks a point on the ultrasound transducer holder 109 so that the reader is able to tell the direction on the schematic drawing. Preferably, the tilt is limited such as by physical stops (not illustrated) limiting movements of the ultrasound transducer holder 109, so that the ultrasound transducer holder 109 does not flip over.

Figure 1F:
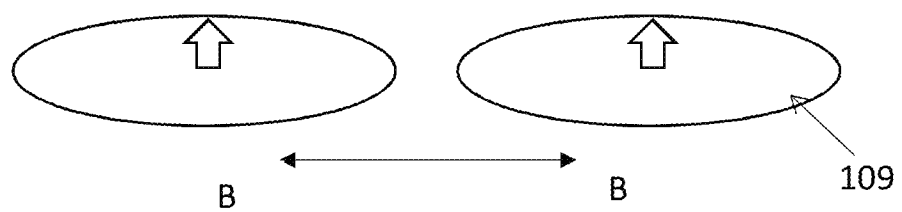
FIG. 1F illustrates an axis, the movements along which a part of the embodiment of FIG. 1B provides possibility.

FIG. 1F illustrates that the ultrasound transducer holder 109 is capable of panning in direction BB, which is horizontal to the ground.

Figure 1G:
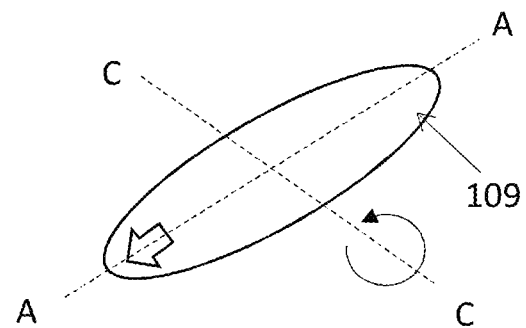
FIG. 1G illustrates another axis, the movements about which a part of the embodiment of FIG. 1B provides possibility.

FIG. 1G shows the ultrasound transducer holder 109 capable of tilting about a pivot CC which is orthogonal the pivot AA shown in FIG. 1E.

Figure 1H:
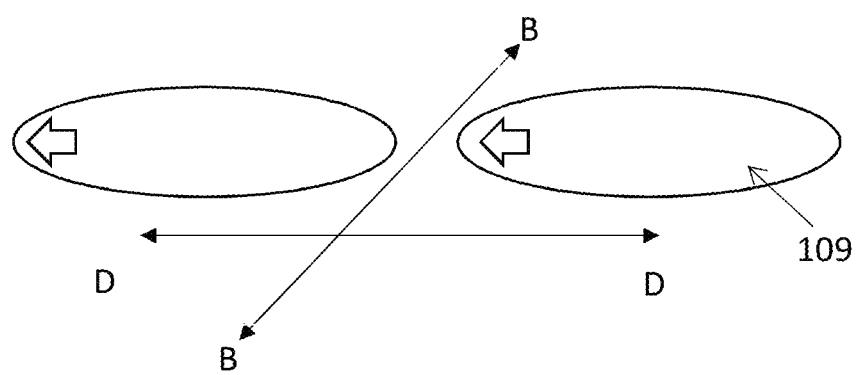
FIG. 1H illustrates another axis, the movements along which a part of the embodiment of FIG. 1B provides possibility.

FIG. 1H illustrates that the ultrasound transducer holder 109 is capable of panning in a direction that is different and preferably orthogonal to the direction BB shown in FIG. 1F.

Figure 1I:
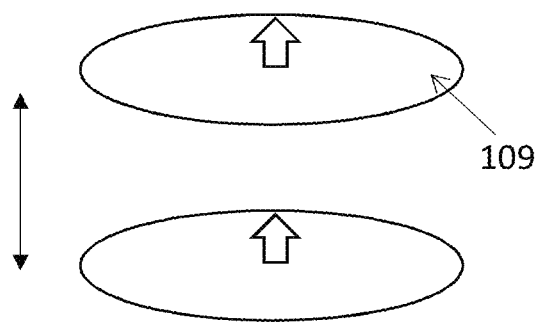
FIG. 1I illustrates possible vertical movements which a part of the embodiment of FIG. 1B provides possibility.

FIG. 1I illustrates that the ultrasound transducer holder 109 is capable of moving up and down, vertically, as the robot base (not illustrated here) beneath the ultrasound transducer holder 109 is capable of raising the ultrasound transducer holder 109 and lowering the ultrasound transducer holder 109.

Being capable of moving in these ways, the ultrasound transducer holder 109 has five degrees of basic movements from which complex movements can be constructed.

Figure 1J:
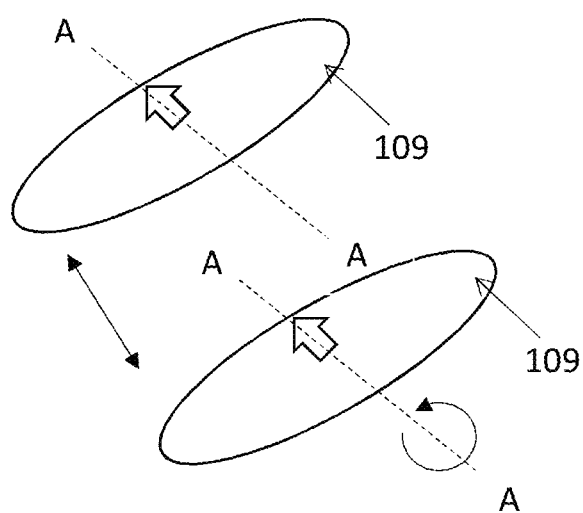
FIG. 1J illustrates the movement as shown in FIG. 1I in a slanted direction after the embodiment is tilted about the axis AA.

FIG. 1J shows a possible complex movement that is produced when the vertical movements of FIG. 1I is slanted by the rotation of the ultrasound transducer holder 109 about the axis AA. The skilled reader should now appreciate that the movements shown in FIG. 1B require the ultrasound transducer holder 109 to be tilted about the axes AA and CC, while being panned in the plane defined by axes BB and DD. Furthermore, there is no need for the ultrasound transducer holder 109 to spin about a vertical axis in the centre of the ultrasound transducer holder 109.

Figure 1K:
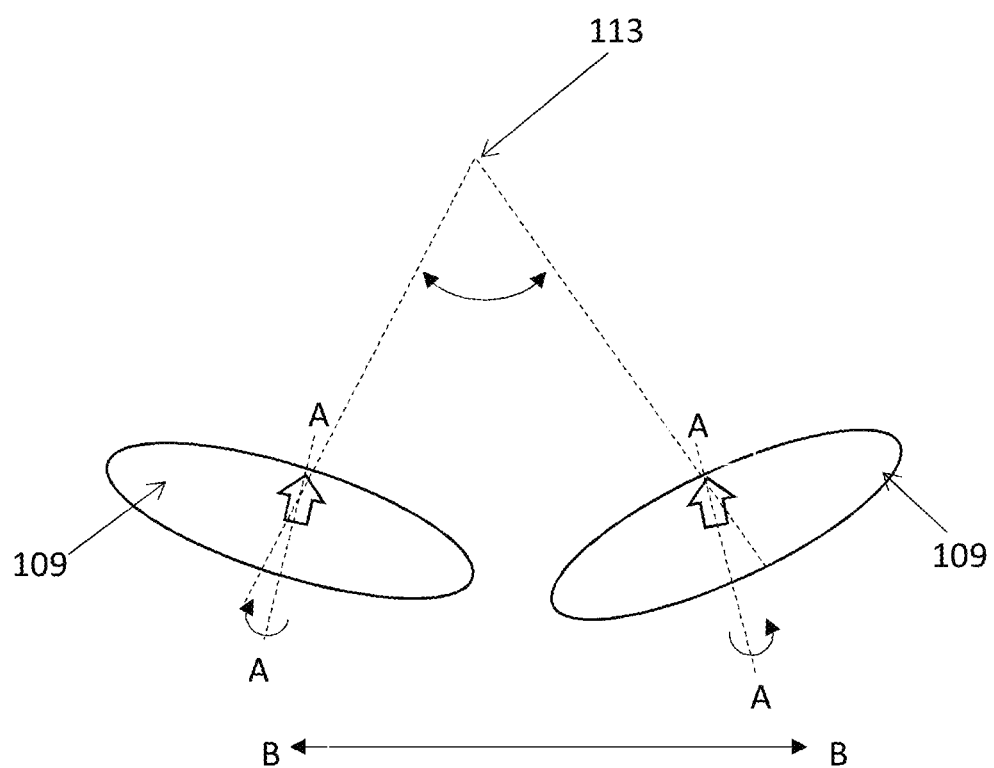
FIG. 1K illustrates a swinging movement which can be produced by a combination of the simple movements shown in FIG. 1E and FIG. 1F.
Figure 1L:
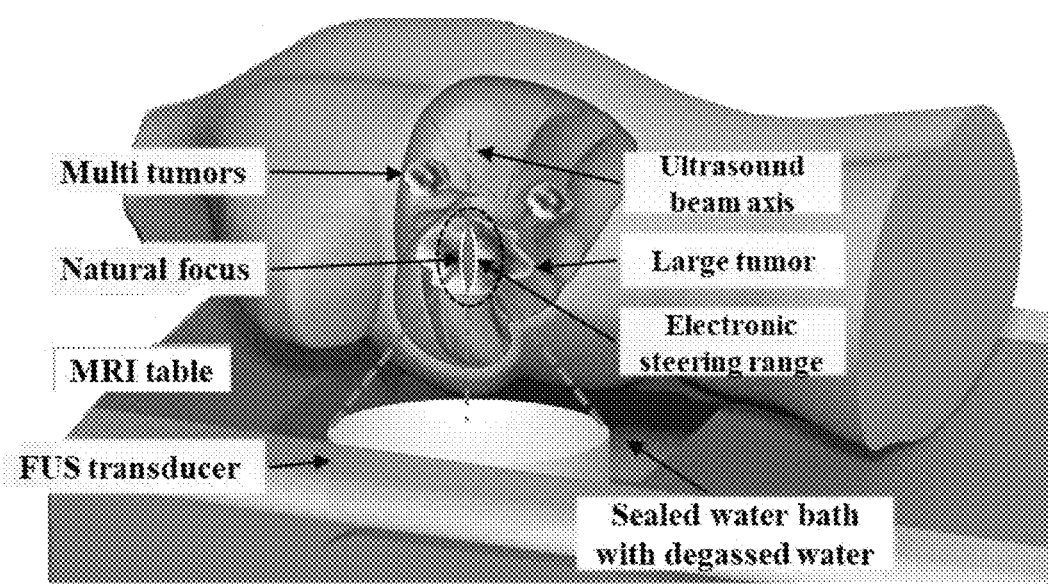
FIG. 1L is a schematics of a clinical MRI-guided FUS therapy for liver tumors, where tissues on the FUS focal spot can be ablated while the patient lies in a prone position with the FUS transducer integrated in a sealed water tank underneath.

FIG. 1K shows how the ultrasound transducer holder 109 can be even made to appear to be swinging about an imaginary pivot, in which the ultrasound transducer holder 109 is tilted to one side and tilted towards the opposite side while ultrasound transducer holder 109 is translated laterally.

In the preferred embodiment of FIG. 2A, for the robot base to be able to move to the ultrasound transducer holder 109 in the ways as illustrated in FIG. 1C to FIG. 1K, the robot base is constructed of several stacked and mutually movable layers. The top of the robot base is an end-effector 10 in which the ultrasound transducer holder 109 may be placed.

Figure 2B:
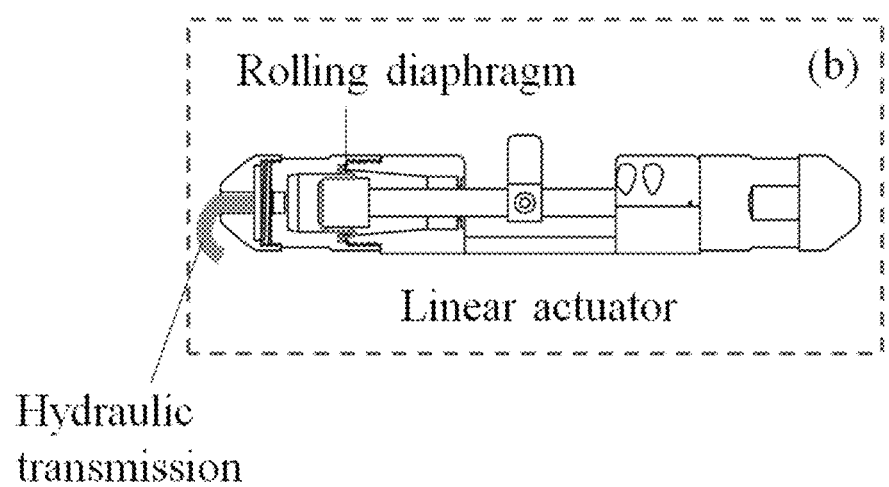
FIG. 2B shows the mechanism of a linear actuator.
Figure 2C:
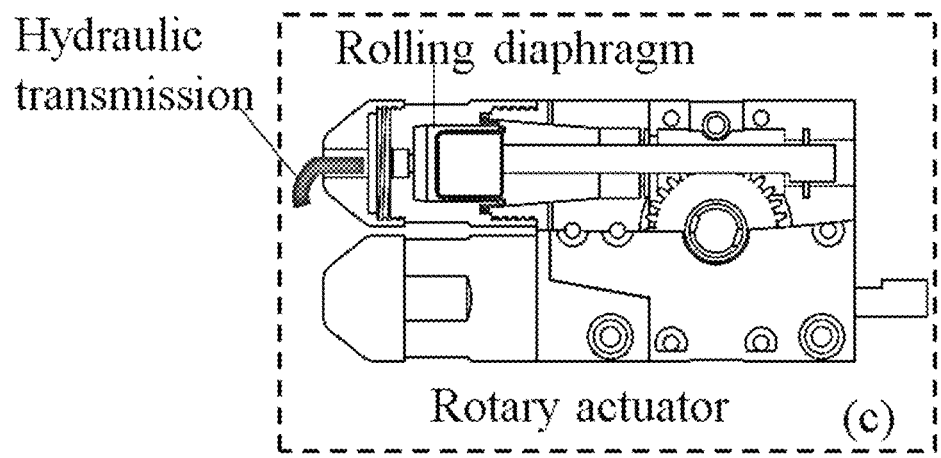
FIG. 2C shows a rotary actuator and FIG. 2D illustrates the robot kinematics with their configuration variables.
Figure 2D:
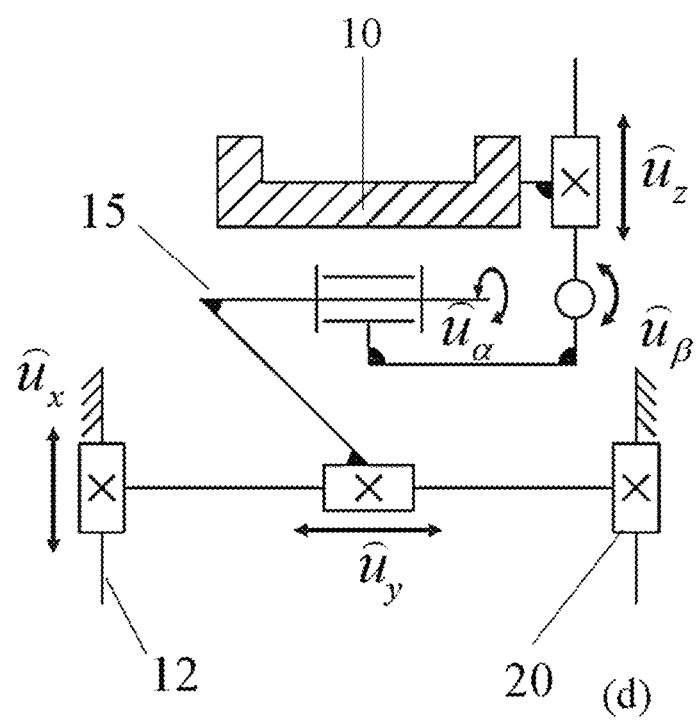
Figure 2E:
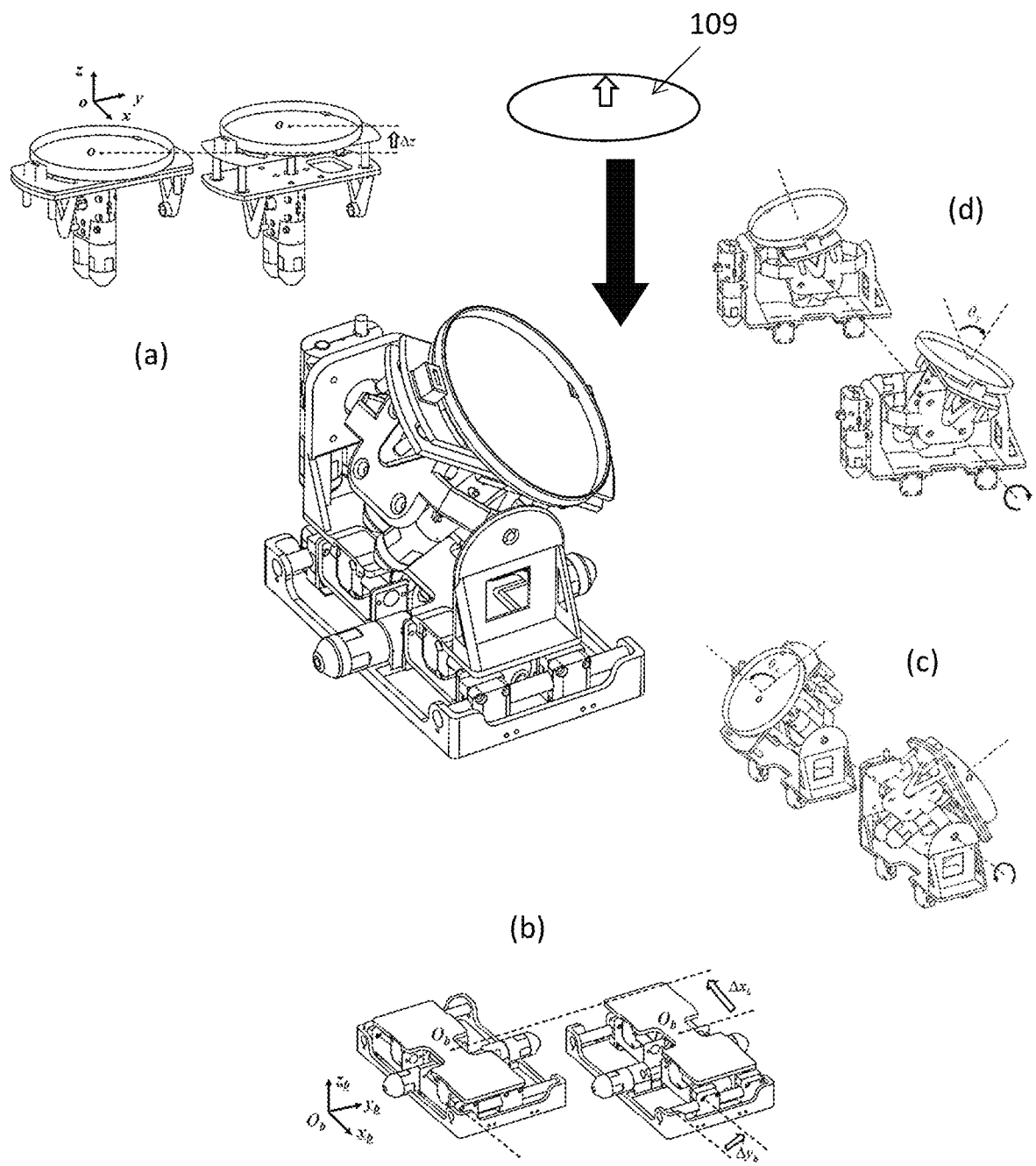
FIG. 2E is an exploded view of the robot base of FIG. 2A.

FIG. 2E is an exploded view of the robot base of FIG. 2A, illustrating the different movements that each layer of the robot base provides. Also, the ultrasound transducer holder 109 is illustrated as suitable for being placed into the upper translation platform 13 of the robot base. Specifically, the robot base provided with two decoupled rotational DoFs (about axes corresponding somewhat to schematic axes AA and CC as illustrated in FIG. 1E and FIG. 1G), shown in the inserted drawings (c) and (d), and panning with the translation (in the plane defined by axes corresponding to schematic axes BB and DD as illustrated in FIG. 1F and FIG. 1H), shown in the inserted drawings (a) and (b).

Figure 11:
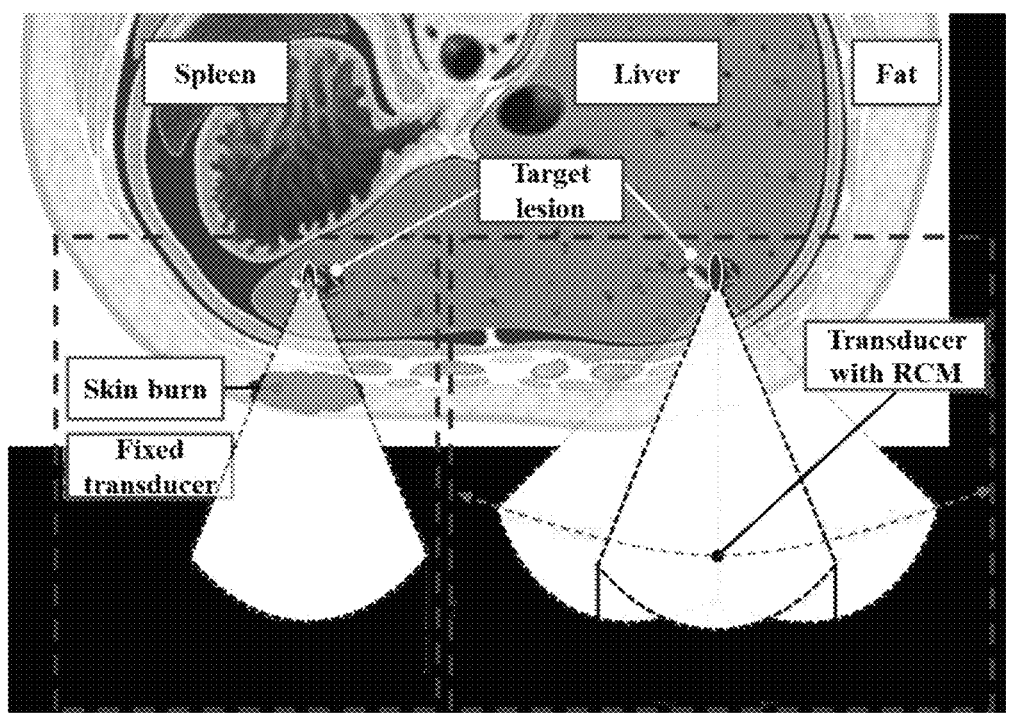
FIG. 11 is a drawing showing the risk of "skin burn" while conducting ablation at a fixed target with a fixed transducer.

Accordingly, the present embodiment is directed to a 5-DOF robotic manipulator having an ultrasonic-transducer holder as the robot end-effector. Such telescoping-manipulation can be simultaneously coordinated with the electronic control of the sonication so as to target the lesions in abdominal or pelvic organ accurately and stably, but without causing skin burn (FIG. 11). The skilled reader would appreciate that each of the movable layers can be omitted in different embodiments, so that these embodiments may be different DoFs, perhaps, for product cost purposes.

Robot Design Criteria

There are four major design criteria that must be considered in the robot design and fabrication process of the present embodiment as follows:

C1) Workspace and dexterity: The large manipulation range of the HIFU beam has to be accommodated in order to cover a right lobe of an adult liver with an average dimension of 140×140×140 mm. The horizontal translation is required with >15 mm linear stroke in two perpendicular directions. Pan-tilt angular movement of the transducer holder has to be >25°. Besides, those DoFs have to be operated independently to implement an irregular steering trajectory so as to "fill" the HIFU spot in a larger tumor (>5 cm) or "switch" the spot to multiple tumors.

C2) Size and waterproof: The robot is compact so it can be housed inside the sealed water tank of a standard MRI-HIFU table, with a size of 275×275×240 mm in L×W×H. Being immersed fully in water, the robot has to maintain dexterous manipulation against the water tension and resistance.

C3) Targeting accuracy and responsiveness: The minimum size (<Ø3 mm) of a liver tumor must also be targeted and ablated by the HIFU. Thus the robot has to steer the transducer holder in order to stabilize the HIFU foci at the target point with an error <0.5 mm. Meanwhile, to reduce the risk of skin burn, as well as to maintain an effective ablation, not only does the robot have to make a rapid response to alter the abdominal skin exposure to ultrasound, but it also has to compensate for respiration-induced motion, with an amplitude and frequency roughly of 18 mm and 0.2 Hz, respectively.

Figure 8:
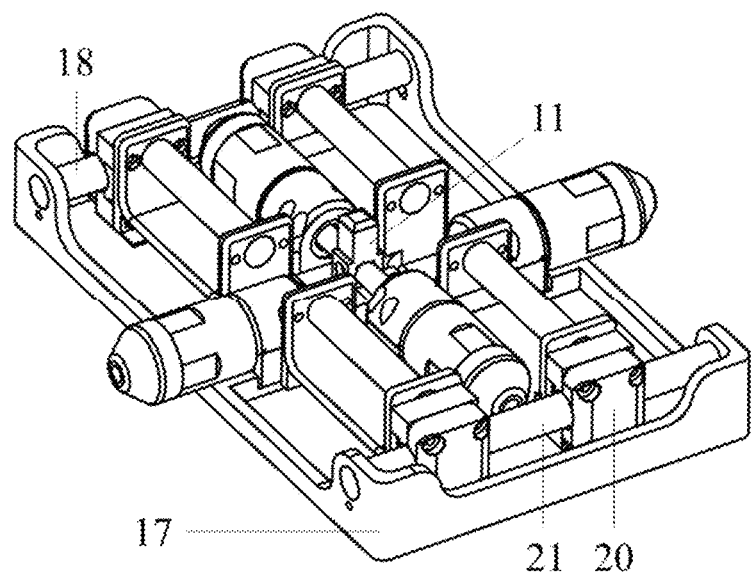
FIG. 8 is a partial view of the robot showing the lower translation platform connected to the bottom framework.
Figure 10A:
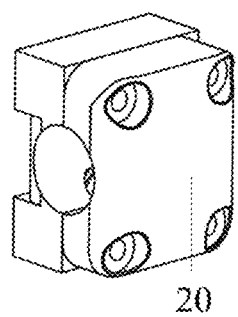
FIG. 10A is a drawing showing the sliders for the lower translation platform.
Figure 10B:
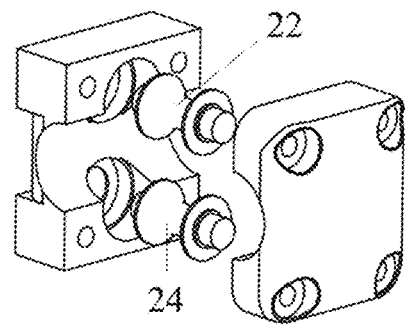
FIG. 10B is a drawing showing the wheels in the sliders for connecting the sliders to the robot platform.

C4) MR-Safety: The present embodiment is designed to meet the MR-safety standard of ASTM F2503-13, i.e., the robot body has to be made of or fabricated with materials that are neither magnetic, metallic nor electrically conductive. Since the robot has to be coordinated simultaneously with the HIFU operation near to MRI isocenter, during the intra-op MR scanning, e.g. to view the thermometry or acoustic radiation force in the body, no EM interference or artifacts should be induced to adversely affect the imaging or even the tracking of the MR makers of the present embodiment Robot Configuration and its Setup To prevent skin-burn injury, two decoupled rotation DoFs, pan and tilt, are coordinated with the translation of transducers. Based on criteria C1), the follower robot is constructed with two translation platforms (namely lower 11 and upper 13), integrated with a rotation platform 15 in between, offering 5 DoFs of manipulation. As shown in FIG. 2A the robot base 12 and world coordinates are represented as $\{x_b, y_b, z_b\}$ and $\{x_w, y_w, z_w\}$, respectively, while the pose of the robot end-effector 10 is represented as $[x, y, z, \theta_x, \theta_y]$. The mechanism of the linear actuator 14 and rotary actuator 16 are shown in FIGS. 2B and 2C. The lower translation platform 11 (FIG. 8), which is connected with the bottom framework 17 of the robot through linear guides 18, enables two mutually orthogonal translational motions (35×35 mm) in a horizontal plane. For each DoF of the lower translation platform, there are four 3D-printed sliders 20 (FIG. 10A), holding the linear guide 21 with two wheels (FIG. 10B), up and down (22, 24), thus eliminating the sliding friction in order to enable a smooth movement of the platform.

Figure 9:
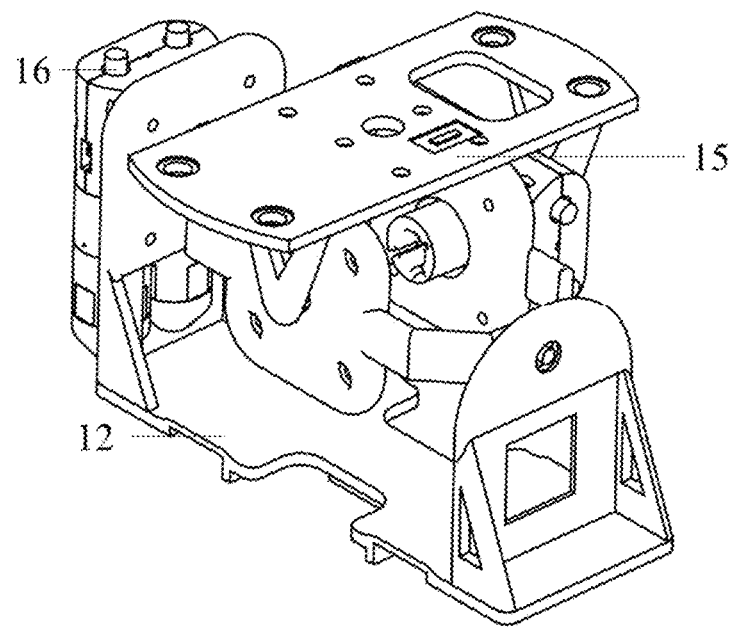
FIG. 9 is a partial view of the robot showing the rotation platform connected to the robot base.

The robot base (FIG. 2A) was built on top of the lower translation platform, housing the rotation platform with bearings. This guarantees the rotations in a range of ±25° along two axes parallel to the lower platform translation. The upper translation platform 13, which is built on top of the rotation platform 15 (FIG. 9), follows the rotation along the $y_b$ axis of the robot base 12. The purpose is to guide the normal force/translation relative to the rotation platform within the range of 35 mm. The transducer holder as an end-effector 10 is built on top of it, following the upper translation platform movement. FIG. 2D illustrates the robot kinematics of the present embodiment in a schematic diagram with their configuration variables.

Based on criteria C4), to minimize the interference during the MR imaging process, the key components, such as the transducer holder, base and actuators of the follower robot were made from 3D-printed polymer composites (VeroWhitePlus and MED610, Stratasys, US). The remaining parts such as the quick-fit connector on pipelines are also made of non-metallic and non-ferromagnetic materials. To register and track the robot end-effector into the MRI domain, wireless RF-markers (Ø3×8 mm) are employed, which can be embedded in the transducer holder, giving rise to 6-D continuous tracking with respect to (w.r.t.) the MR image coordinates (FIG. 2A. To enhance image quality, an MR body coil should be placed on the patient's back throughout the treatment.

Diaphragm-Based Hydraulic Actuation

A diaphragm-based hydraulic actuation system is proposed in order to provide quick response and low transmission latency, large output force, and accurate control with MR-safe standard parts based on criteria C3). Each robot DoF actuation is driven and transmitted through a pair of hydraulic pipelines. Use of two-cylinder actuators that can generate rotary motions in a range of ±90° (FIG. 2C). However, the central gear introduced for bidirectional motion did increase each unit in size to 120×58×28 mm. Based on criteria C2), the robot should be compact in the confined space of the water tank, while enabling fully tele-manipulation inside the MRI operating table. Consequently, the linear actuator was redesigned (150×28×28 mm) without a central gear, but still with the ability to offer bidirectional linear motion with a 35-mm stroke. The mirrored arrangement of two-cylinder units can reduce its weight as compared to the rotary actuator (FIG. 2C), despite its length being increased (FIG. 2B). For applications involving linear movements only, such as the lower translation platform of the robot, this linear actuator can be adopted to reduce the overall footprint of the robot. To this end, two linear cylinders are integrated in the lower translation platform, and three rotary actuators are used in the remaining three DoFs, one for guiding the linear motion of transducer holder, the other two for its pan and tilt.

Rolling diaphragms (MCS2018M, FEFA Inc.) sealing a hydraulic pipeline at both ends are mainly made of fabric-reinforced rubber. Each diaphragm is capsulated in a cylinder with a stroke length of around 35 mm due to the flipping inside-out motion of the diaphragm, while rolling over the head of the piston rob under fluid pre-pressure of 0.1 Mpa. Such a pressure has been tested to reduce most of the gear backlash. A cylinder unit is connected with a metallic piston through a 10-m long pipeline fully filled with distilled water. Therefore, a bundle of pipelines has to be channeled via a waveguide in between the MRI and control rooms. Note that the connected piston (CDRQ2BS20-180, SMC pneumatics, Hong Kong) has to be actuated by electric motors in the control room. Actuation latency of the presented hydraulic transmission could be optimized by the selected pipeline material (semi-rigid nylon), and its appropriate inner diameter (Ø2 mm). Parts of rather elastic pipelines in spring shape are connected close to the cylinder ports of the robot, allowing certain flexibility, without hindering the robot movement. However, these parts have to be short (<100 mm) in length, which is always a tradeoff with the robot actuation latency.

This hydraulic actuation design could enable the platform to be immersed and operated inside the tank of degassed water (criteria C2). In some case, instead, degassed water can also be filled in a water bag (e.g. made of silicone) attached with a gel pad, separating the transducer and the patient.

Model-Based Robot Control

Apart from promising the mechanical structure needed, analytical forward kinematics of the robot is required for model-based control. The robot at rest is assumed as the initial status, and the center of the robot base is assumed to be its coordinate origin, O. The task space is defined as the 5-D poses of the end-effector (i.e. the centroid of transducer holder) w.r.t. the coordinate shown in FIG. 2A.

The pose of the end effector $p = [x, y, z, \theta_x, \theta_y]^T \in \mathbb{R}^5$ can be calculated as follows:

$$p(\hat{u}) = \begin{bmatrix} (R + \hat{u}_z)\sin\hat{u}_\alpha + \hat{u}_x \\ (R + \hat{u}_z)\sin u_\beta + \hat{u}_y \\ l + (R + \hat{u}_z)\sqrt{1 - \sin^2\hat{u}_\alpha - \sin^2\hat{u}_\beta} \\ \hat{u}_\alpha \\ \hat{u}_\beta \end{bmatrix} \quad (1)$$

where $\hat{u} = [\hat{u}_x, \hat{u}_y, \hat{u}_z, \hat{u}_\alpha, \hat{u}_\beta]^T \in \mathbb{R}^5$ represents the robot configurations, which correspond to three translations along x, y, and z axes, as well as rotations along x and y axes; parameter l is the depth of focal point relative to end-effector.

The transition mapping from configuration space to task space can be expressed as $$\dot{p} = J\dot{u} \quad (2)$$

where the Jacobian matrix J can be calculated by differentiating the position p w.r.t. the input û.

Provided with the matrix J, the inverse transition mapping is established as:

$$\dot{u} = J^\dagger \dot{p} \quad (3)$$

where $J^\dagger$ is the generalized inverse of J. Notice that the configuration space parameters û are defined on the robot part in the water tank, which are assumed linearly correlated with conductor-input.

The correlation coefficients of translation and rotation motions are different, and are set as $K_t$ and $K_r$ respectively. That is, $$\hat{u}_x = K_t u_x, \hat{u}_y = K_t u_y, \hat{u}_z = K_t u_z,$$

$$\hat{u}_\alpha K_r u_\alpha, \hat{u}_\beta = K_r u_\beta. \quad (4)$$

where $u = [u_x, u_y, u_z, u_\alpha, u_\beta]^T \in \mathbb{R}^5$ means the actuation command to conductor-side motors.

To utilize the analytical model for actuation command calculation, registration from position tracking coordinate to the model coordinate (FIG. 2A) is required after the robot base is fixated inside the water tank.

Transducer Pose Tracking Under MRI

Precise localization of the transducer pose under MRI is the prerequisite to registering the robot tasks in the MRI domain, where the HIFU planning takes place, hence enabling accurate targeting of ultrasound foci w.r.t to the treatment RoI. It has been proposed to use wireless MR-markers which enable continuous real-time positional tracking in MRI coordinates. With a circuit specifically designed to amplify the MR signal, the marker could provide high SNR compared to background even under low flip-angle (<1°) excitation. In the present design three markers are integrated on the transducer holder to detect its 6-D poses, including both the center position and normal direction of the end-effector. A 1D-projection pulse-sequence can be applied so as to enable fast acquisition of positional signal (>30 Hz). However, the signal profile of each marker may be influenced by the marker orientation and its distance to the MR imaging coils. This would introduce signal noise into the detection of the marker centroid, thus miss-calculating the end-effector pose. To ensure localization accuracy and to maintain smooth tracking, the robot kinematics model is used to predict the end-effector pose and its values are combined with measured values from the markers via Kalman filtering.

The prediction model can be given as:

$$\hat{u}_{t+dt} K \cdot du + \hat{u}_t + w_t$$

$$p_{t+dt} = J(\hat{u}_{t+dt} - \hat{u}_t) + p_t + v_t \quad (5)$$

where $p_{t+dt}$ and $p_t$ are the end-effector poses, $\hat{u}_{t+dt}$ and $\hat{u}_t$ are the robot configurations, subscript "t+dt" and "t" denote the time step t+dt and t, $w_t$ and $v_t$ represent the process noise and observation noise.

$K = \text{diag}([K_t, K_t, K_t, K_r, K_r])$ is the mapping matrix co-relating actuation input from the control room to the robot output in the MRI room.

The combined robot configuration can be computed as:

$$\hat{u}^*_{t+dt} = \hat{u}_t + K \cdot du + G(p_{mea} - p^*_t) \quad (6)$$

where G is the Kalman gain.

Thus, the combined end-effector pose can be calculated using Eq. (1), $p^*_{t+dt} = p(\hat{u}^*_{t+dt})$.

Robot Positioning Accuracy

An experiment was conducted to validate the positioning accuracy along each DoF. As all translation DoFs are configured using the same linear actuation mechanism as in FIG. 2B, while two rotation DoFs are in FIG. 2C. The positional accuracy of translation and rotation are both illustrated in FIGS. 3. A 6D EM tracker (Aurora, NDI Medical) was vertically attached on the edge of upper translation platform that carries the transducers. This EM-tracked pose act as the positional ground truth. In the translation accuracy evaluation, 10 positions along the x-axis were defined with a 1-mm spacing (FIG. 3A). Based on the relationship between motor's output angle and follower-side translation (Eq. 4), actuation command could be calculated. The robot was steered to attain all targets successively. The mean positioning error (involving 10 times repetition) of x translation DoF was 0.098 mm, and the maximum error was 0.2 mm (FIG. 3A). With similar testing method, the mean rotation error was found to be 0.140°, with a maximum value of 0.4° (FIG. 3B). This positioning accuracy outperforms existing robotic platforms designed for an MRg-FUS system, among which a representative one could satisfy ±0.5 mm translation and ±1° accuracy.

Positional Frequency Response

Figure 4A:
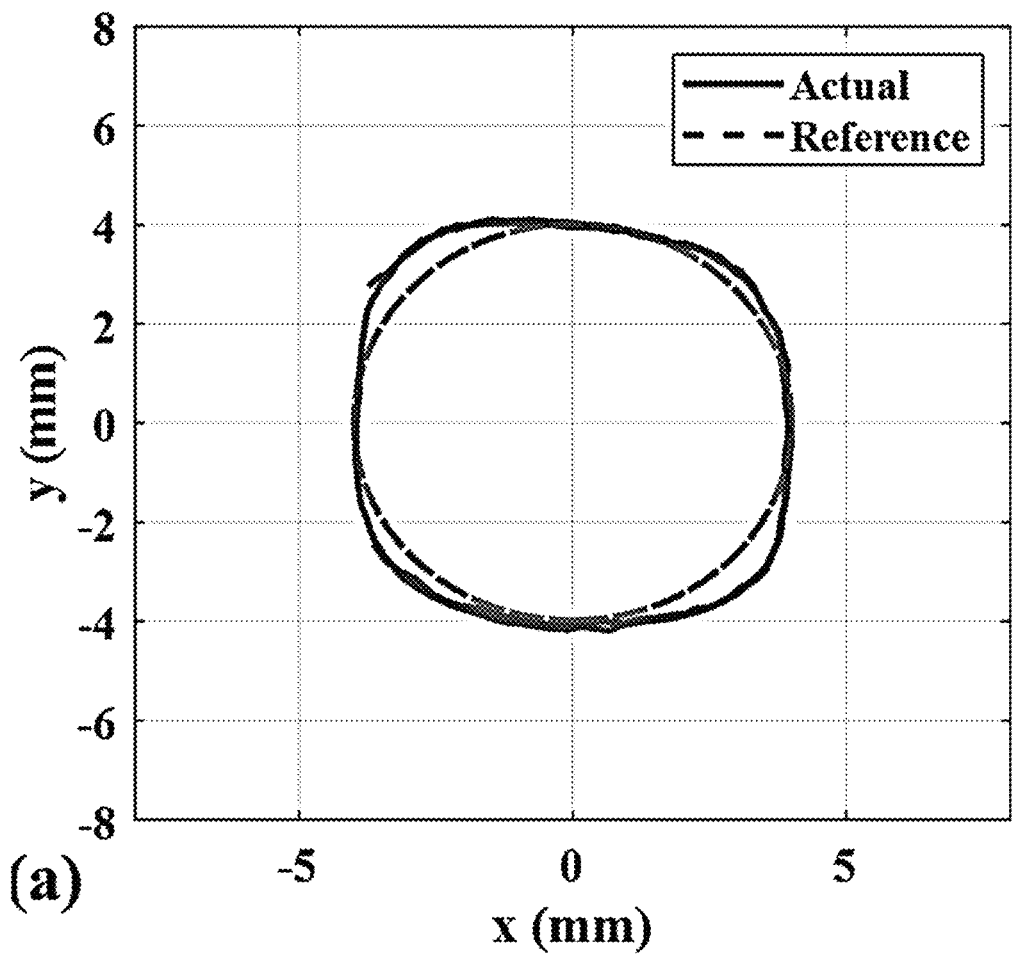
FIG. 4A shows the results of a robot commanded to follow a circle in x-y (MRI coronal) plane at range of frequencies from 0.1 Hz to 4 Hz.
Figure 4B:
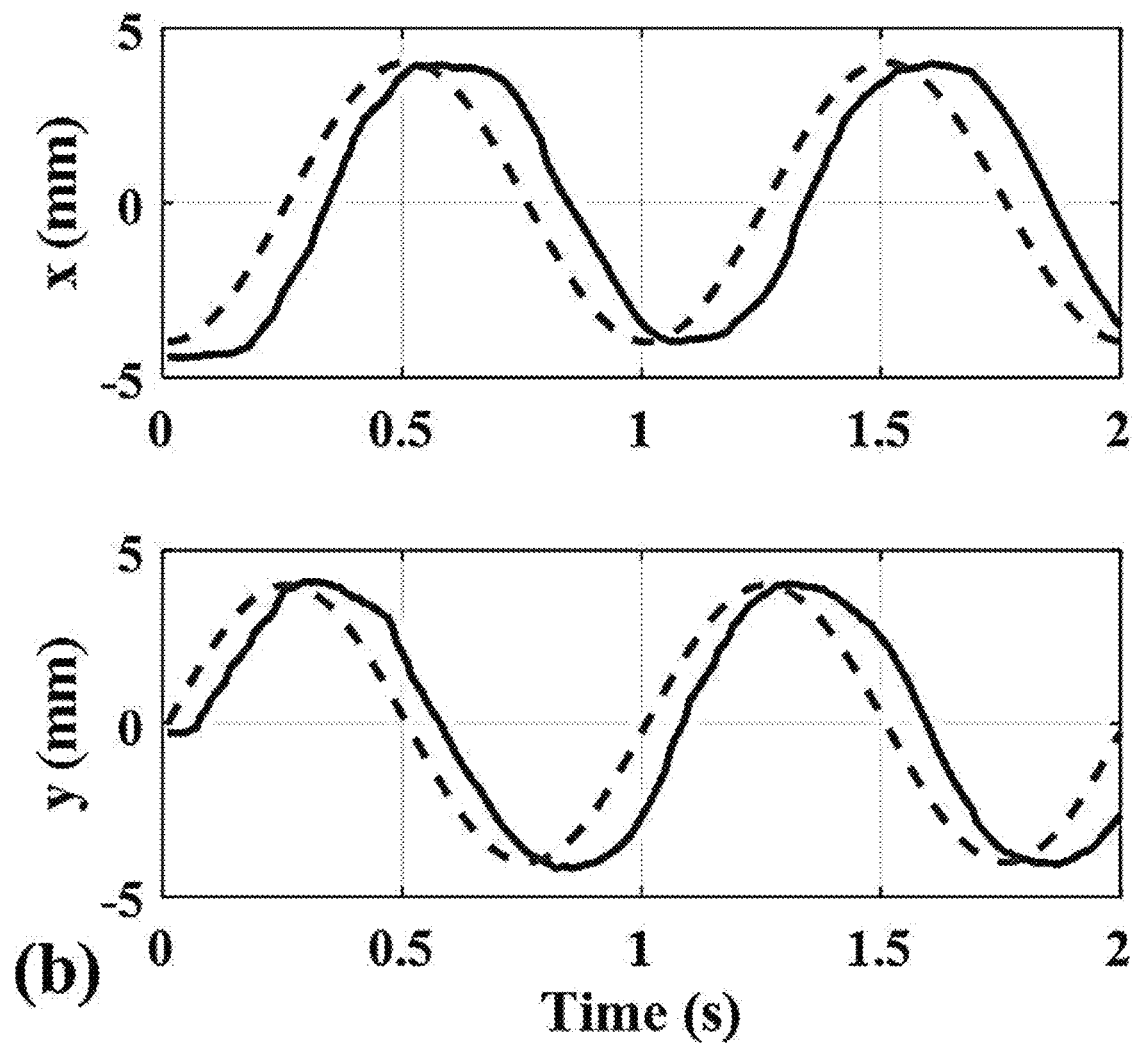
FIG. 4B shows the sinusoidal response of the robot end-effector along x and y axis.

A frequency response test was conducted to evaluate the dynamic performance of the robot. The primary concern was with the translational DoFs of the robot base, which are most challenging for responsiveness due to the higher payload compared with other DoFs. In the experiment, the actuators of x and y DoFs were set to follow sinusoidal inputs with c phase difference (FIG. 4B), thus cooperatively tracing a circular trajectory (FIG. 4A) in the MRI coronal plane at a range of frequencies from 0.1 Hz to 4 Hz. Hydraulic transmissions from the stepper motor input to the robot output are realized using 10-m pipelines to meet the requirements of transmission length between control room and scanner room.

Figure 4C:
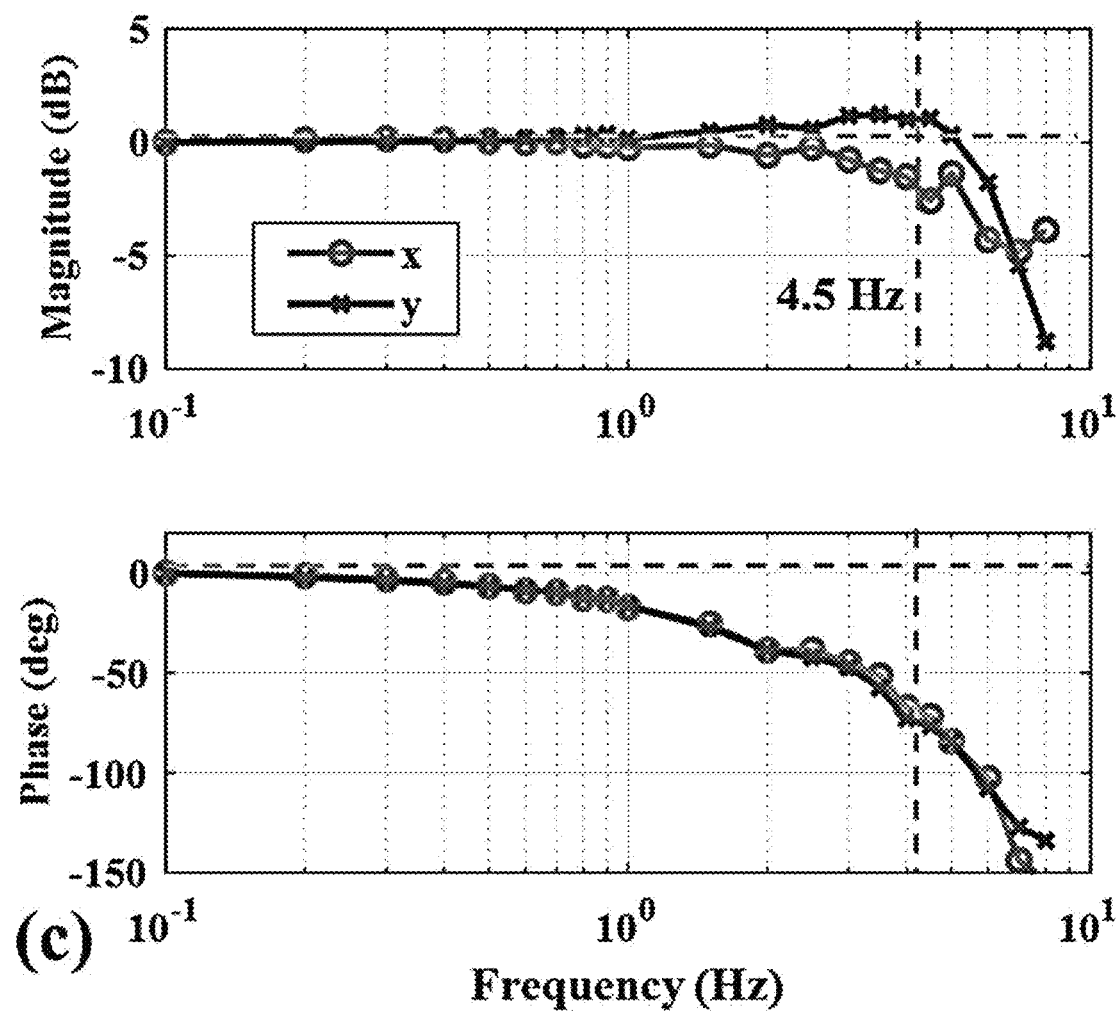
FIG. 4C shows a bode plot of x and y translations sampled during circular trajectory tracking.

The radius of the reference circle was set at 4 mm, with the tracking frequency increased from 0.1 Hz to 8 Hz at an interval of 0.1 Hz. The robot end-effector output motion was measured by a 6D EM tracking coil. As illustrated in FIG. 4C. the bandwidth of x and y DoFs reaches about 4.5 Hz, at which the magnitude decreases −3 dB. The phase lag is kept less than 75° within the bandwidth. The transmission latency measured from the computer signal to robot output is 100 ms on average with the frequency less than 4.5 Hz. The results demonstrate the ability to compensate for respiratory motion of the liver with a frequency <0.2 Hz.

End-Effector Pose Adjustment Towards Fixed Focal Spot

To prevent skin-burn while conducting ablation at a fixed focal spot in tissue, the robot end-effector should be capable of providing remote center of motion (RCM) of the transducer about the foci. With such RCM motion during ablation, the average exposure time of a particular skin region to ultrasound energy can be reduced, thus alleviating the heat accumulation (FIG. 11). To the left in FIG. 11 the transducer is fixed and the skin burn area is wide. To the right in FIG. 11 the transducer moves along the arc shown, so the exposure at any one area of the skin is reduced. This could decrease the treatment time as there is no need to periodically interrupt the ablation procedure for skin cooling.

Figure 5:
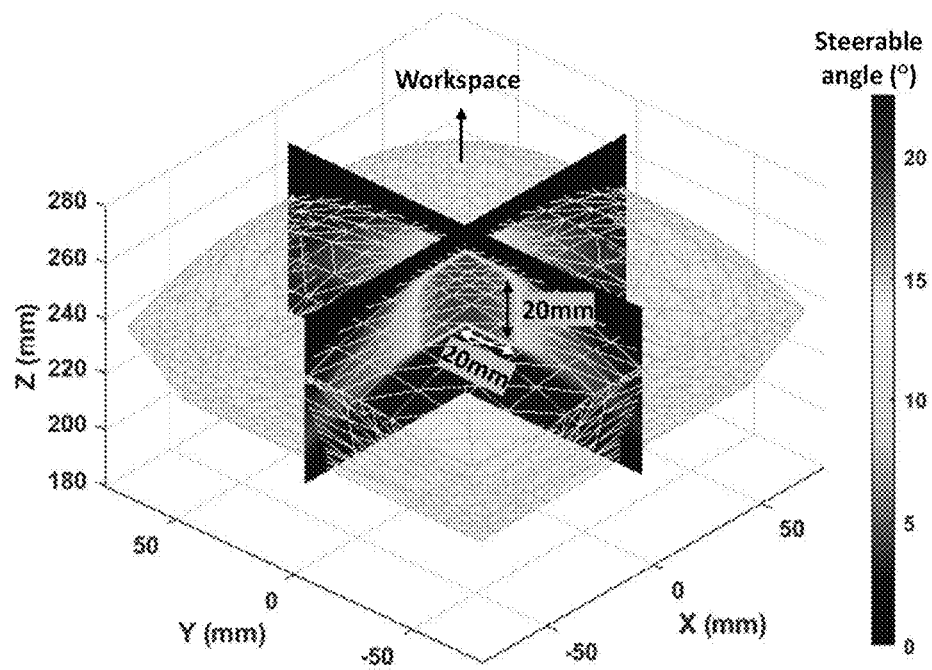
FIG. 5 is a three-dimensional diagram of a mechanical steering workspace of ultrasound foci. About each focal point, the robot enables a remote center of motion (RCM) to reduce accumulated exposure of a particular skin area. The larger the steerable angular range of the RCM, the warmer color at the focal point in the workspace.

It should be noted that skin burn is induced by ultrasound beam interference with abdominal tissues while the transducer holder is rotated. As shown in FIG. 5, the reachable workspace of the focal point was calculated based on the robotic forward kinematics. The size of the workspace is about 100×100×35 mm in L×W×H, which can be further enlarged by 40 mm when combined with electronic steering. The focus is on the mechanical manipulation of focal point using the robot. Around each foci, a maximum steerable angle of RCM was calculated to quantify the skin-burn prevention capability, which is varied with the focal point location, i.e., the robot enables a remote center of motion (RCM) to reduce the accumulated exposure of a particular skin area. Therefore, it has been determined the robot of the present embodiment with pan-tilt rotation DoFs is capable of decreasing heat accumulation on the skin. The steerable angle around the foci in two orthogonal slices is visualized by the warm color gradient, i.e., the larger the steerable angular range of RCM, the warmer the color at the focal point in the workspace. A maximum steerable angle of 20° can be provided for the focal point in the workspace center. In the prior art, the position of the foci of the ultrasonic waves can moved, i.e. electronic steering rang, by changing the frequencies or other waveform parameters of the ultrasonic transducers in the ultrasonic transducer holder, such that the combined wavefront is focused at the target in the abdomen. However, this approach is limited along the ultrasound beam axis. Hence, the freedom to pan and tilt as provided by the embodiment provides a superior 3D workspace around the foci (RCM). In some variations of the embodiment, the pan and tilt of the ultrasonic transducer holder may be used alone to move the foci. In other variations of the embodiment, the pan and tilt of the ultrasonic transducer holder may be used together with changing the frequencies or other waveform parameters to move the foci. This gives an increased level of control to the design of the treatment on the patient. If skin burn is not expected to be severe, for example, movement of the ultrasonic transducer holder may not be necessary, and it may be quicker in some instances to complete the treatment by moving the foci across the volume of a tumor just by varying the frequencies or other waveform parameters.

MR Compatibility Test

Figure 6A:
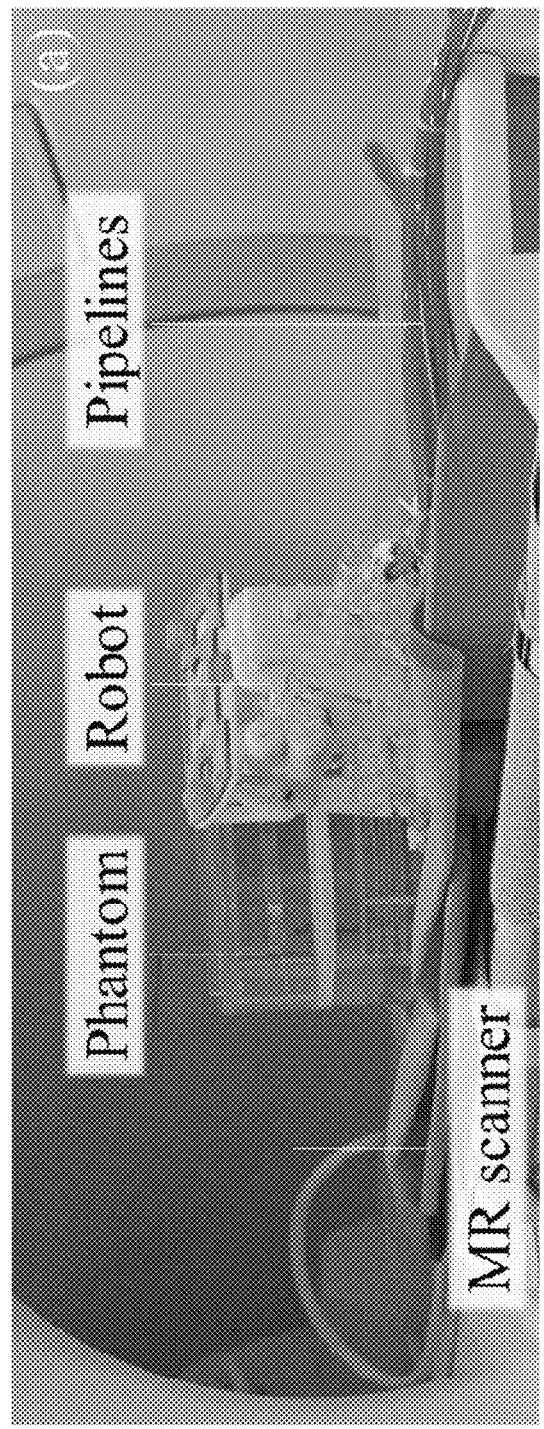
FIG. 6A is a photo of a robot and phantom placed close to the isocenter of a 1.5T MRI scanner.
Figure 6B:
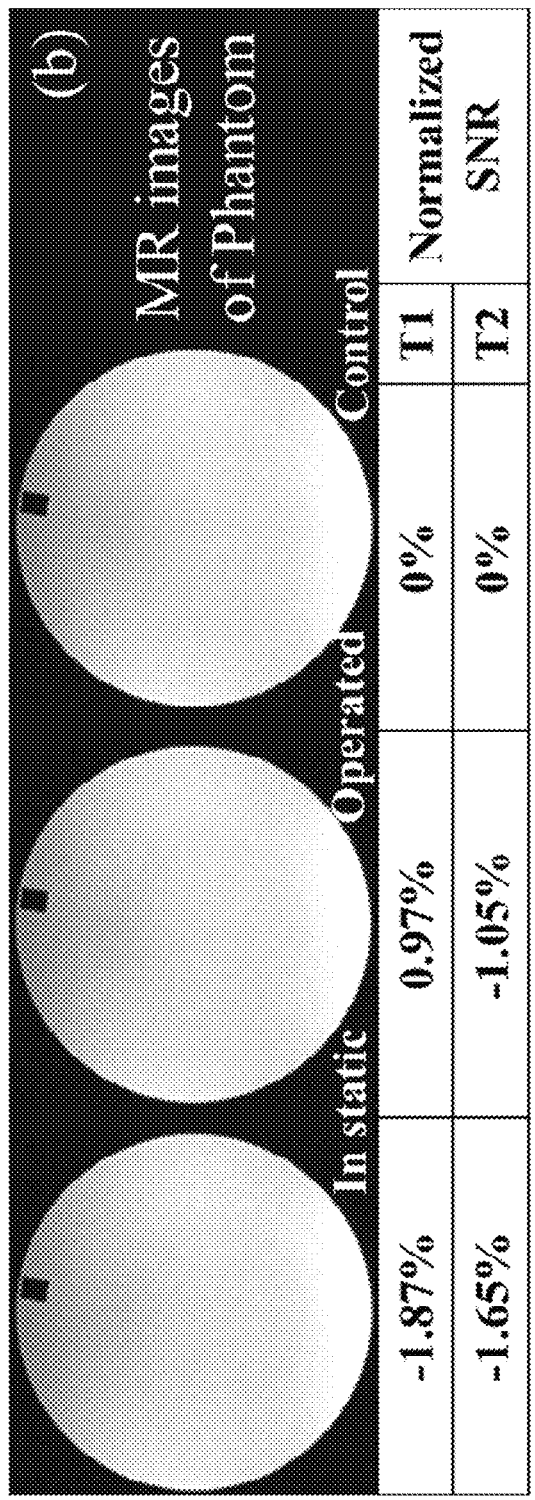
FIG. 6B is an image showing that negligible EM interference was found from the MR images of an MRI phantom put alongside the robot and a table summarizing the normalized Signal to Noise Ratio (SNR) results of T1 and T2 under three operation conditions.

An MR compatibility test (FIG. 6A) was conducted to evaluate the EM interference of the robotic system of the present embodiment to MR images using a 1.5T MRI scanner (SIGNA, General Electric Company, USA). An MRI water phantom (J8931, J.M. Specialty Parts, USA) was used to provide signal source, with a body coil attached for imaging. The robot and the phantom were placed close to the isocenter of the 1.5T MRI scanner. Both T1-weighted and T2-weighted images were acquired using fast field echo (FFE) and turbo spin echo (TSE) sequences, respectively. Before introducing the robot to scanner room, 3D MR images of the phantom were obtained as the baseline for signal-to-noise (SNR) comparison. Also, 3D imaging of the phantom was performed while placing the robot besides the phantom. As shown in FIG. 6B negligible EM interference was found from the MR images of an MRI phantom put beside the robot. The normalized SNR results of T1 and T2 under three operation conditions are summarized in the table of FIG. 6B. There are no observable image artifacts found in the MR images with a SNR loss <2%, even when the robot is in operation. This offers the capability of performing MR imaging and robot actuation simultaneously, which is required for respiratory motion compensation and skin-burn prevention during the ablation.

MR-Based Tracking Test

Figure 7A:
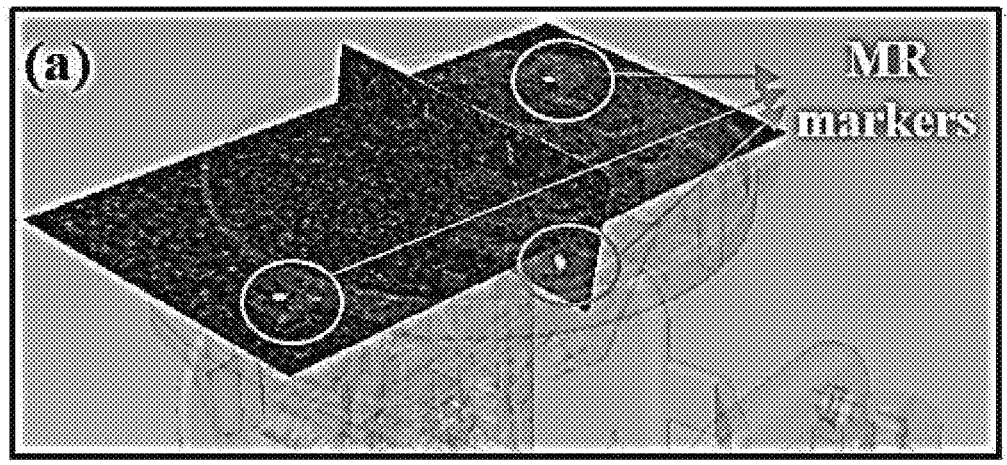
FIG. 7A is a three dimensional image with three MR marker positions obtained from an MR image so as to register the robot in MRI coordinates.
Figure 7B:
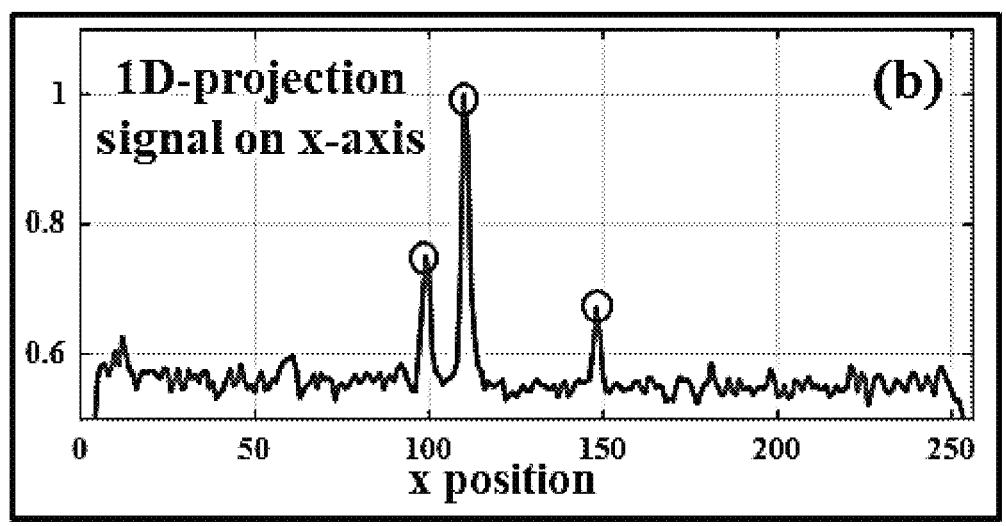
FIG. 7B is a graph showing a one dimensional projection signal of three markers along x axis.
Figure 7C:
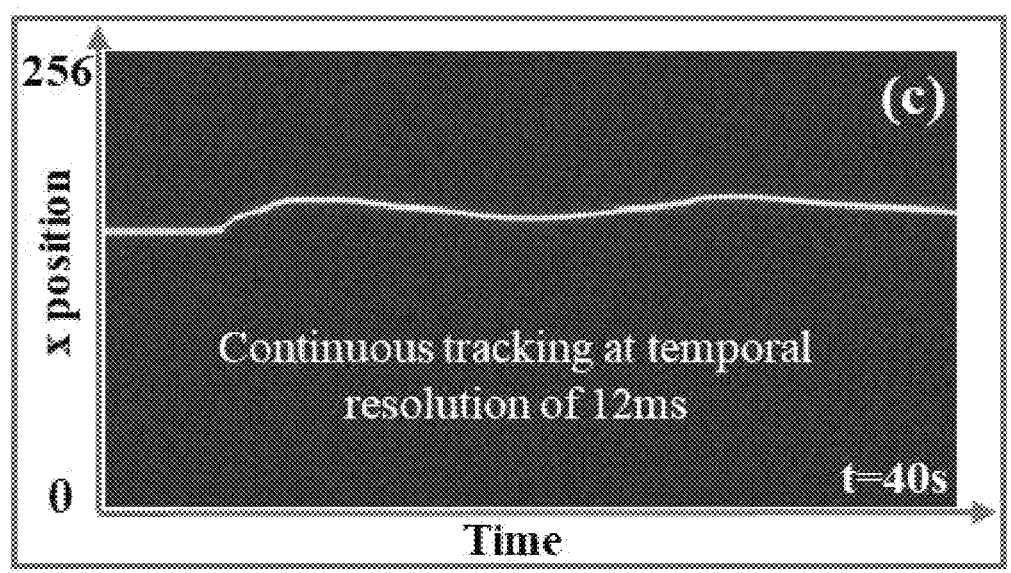
FIG. 7C is a graph showing a continuously projected position on the x-axis acquired at 83.3 Hz. The SNR is so high that a single point signal within 0-256 pixel can be contrasted and observed at each time step.

Wireless MR markers are utilized to localize the robot end-effector in MR image coordinates. The markers are made of cylindrical glass tubes (Φ3×8 mm) with Gadolinium-doped water (concentration: 10 mM) sealed inside to provide a signal source. A miniaturized RF-coil (1.5×6.7 mm) was attached to the tubes to locally amplify the MR signal, thus offering high image contrast against the background. A solution was introduced in the hydraulic actuation to decrease the T1 relaxation time of water, thus eliminating the background signal from the actuation liquid. As shown in FIG. 7A with the positions of three markers obtained, the robot initial pose can be registered to the MR image coordinates. A 1D projection pulse sequence is employed to enable real-time tracking of the marker positions. FIG. 7B shows the intensity profile of the 1D projection signal of three markers along the x axis, where the peaks of markers can be extracted along the projected axis. Then 3D positions of the markers can be accordingly solved by imposing geometry constraints, e.g. the relative position of the markers, on the possible combination of 1D marker coordinates. A real-time tracking test was conducted by continuously performing 1D projection scans with the markers moved by the robot. FIG. 7C gives the time-series projection image along x-axis in a period of 40s, with a temporal resolution of 12 ms. In FIG. 7C there a continuously projected position on x-axis acquired at 83.3 Hz. The SNR is so high that a single point signal within 0-256 pixel can be contrasted and observed at each time step. The marker image demonstrates high contrast against the background, which can be automatically detected to provide real-time positional feedback under MRI.

The present embodiment is a 5-DoF tele-manipulated positioning system for MRg-FUS treatment in abdominopelvic organs. It is a compact robot that can incorporate 3-DoF translation and 2-DoF rotation of a FUS transducer array, which is the first of its kinds facilitating the largest acoustic window to track a HIFU spot inside a patient's body, as well as the most degrees of flexibility to avoid residual sonication-induced skin. However, skin-burn prevention capability is essential, especially for large organs.

The steerable angle of RCM for each foci can be further enlarged by upgrading the hydraulic actuators to those with larger motion stroke, e.g. continuous motor equipped with 3 cylinders providing unlimited rotation range, as presented in. Implemented with fast-response (4.5-Hz bandwidth, 100-ms delay) hydraulic actuation, this robot can compensate for physiological motion, thus stably fixating the focal spot on a moving lesion target. Positional frequency response has been validated on the two DoFs moving the robot base along the MRI coronal plane, thus demonstrating its ability to perform respiratory motion (<0.2 Hz) compensation.

By replacing the stepper motors, the high-end velocity servo motors could be incorporated with the aim to further improve the tracking responsiveness and overall dynamics. High positioning accuracy w.r.t. translation (max. error: 0.2 mm) and rotation (max. error: 0.4°) can offer fine mechanical steering, along with the electronic control of the HIFU spot. Note that the focal spot locations are measured from the lesion centroids on the MR images. The positioning accuracy test of the robot in the present embodiment is only indicative of the transducer holder positioning itself, without considering some factors in clinical scenarios (e.g. tractive and shear forces induced from movements of the transducer in water, inherent MRI image distortion and resolution limitations).

The system is equipped with wireless RF markers, which enables continuous registration of the robot task space in the MRI coordinates. The positioning accuracy could be further improved by incorporating MR safe encoders (e.g. Zap-FREE® MR431, Micronor Inc., Camarillo, USA) to each DoFs of the robot. Furthermore, robust feedback control can be implemented by fused sensory information from the encoders and MRI feedbacks. The large-volume workspace (100×100×35 mm$^3$) is evaluated by simulation, indicating the possibility to handle big-tumor or multi-tumor treatment in large abdominopelvic organs (e.g., adult liver, ~16 mm length in right lobe). The compatibility with MRI and real-time MR-based tracking have also been verified, respectively, by a SNR test and a 1D-projection technique. It has been shown that the robot actuation does not induce observable artifacts using sensitive a 1D-projection pulse-sequence, even when the robot is placed and actuated near the MRI scanner isocenter.

The present embodiment is useful for abdominopelvic organ tumor treatment. In addition to HIFU, recent advances in FUS technology also facilitates other non-thermal treatments, such as hyperthermia-mediated gene therapy, drug delivery, and blood-brain barrier (BBB) opening. The robot of the embodiment may also be improved through the use of automatic transducer phase modulation (i.e., small-range electronic steering), and its combination with robotic steering for the relevant FUS applications, such as particular acoustic pattern forming under intra-op MRI, rather than a focal spot only.

Figure 12:
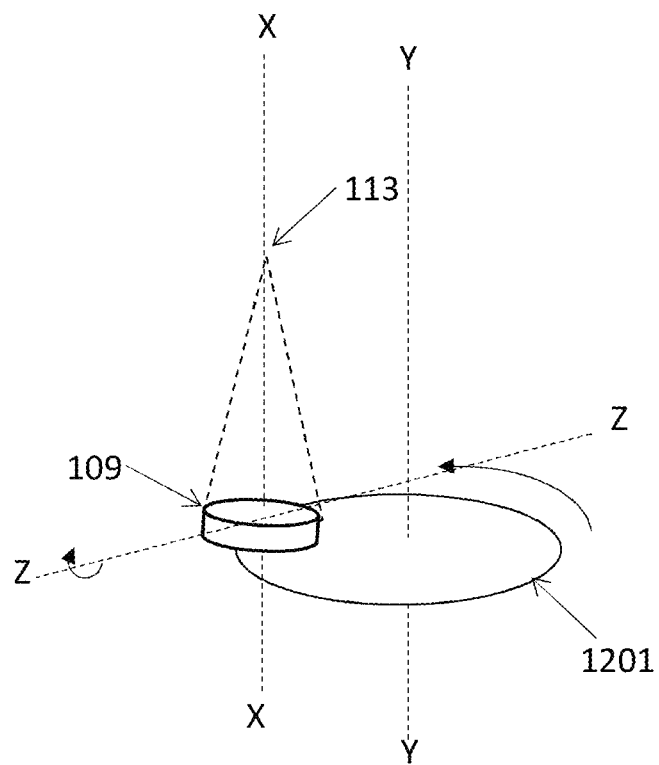
FIG. 12 shows another embodiment schematically, alternative to the embodiment shown in FIG. 2A.

FIG. 12 illustrates another embodiment, which is a robot base that comprises a turntable 1201 capable of spinning about a central pivot YY of the turntable. An ultrasound transducer holder 109 is connected to one side of the turntable. Optionally, although not necessarily, the ultrasound transducer holder 109 is also capable of spinning about an axis XX in the centre of the ultrasound transducer holder 109. Furthermore, the ultrasound transducer holder 109 is capable of tilting about a horizontal axis ZZ. The embodiment can be placed inside a sealed water tank 107 for the transmission of ultrasound waves. All the parts of the embodiment can be made using non-magnetic and non-metallic materials (e.g., plastic) in order to be placed inside or beneath a treatment bed which is part of an MRI machine, in order that the imaging operation of the MRI machine is not affected. Revolution of the turntable can be provided using a set of non-metallic gears (not shown) that are, preferably, driven by hydraulics.

Figure 13A:
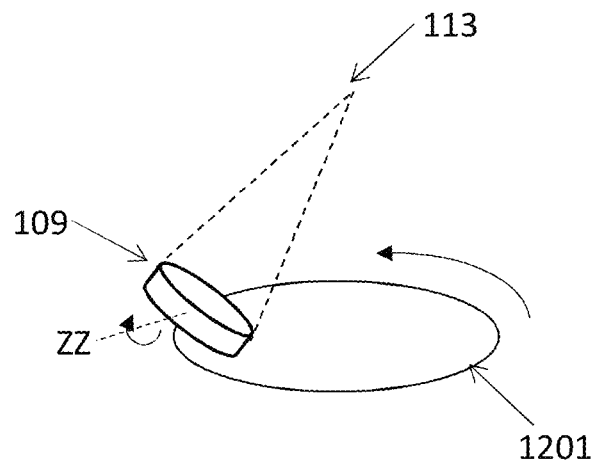
FIGS. 13A-C illustrate the operations of the embodiment of FIG. 12.
Figure 13B:
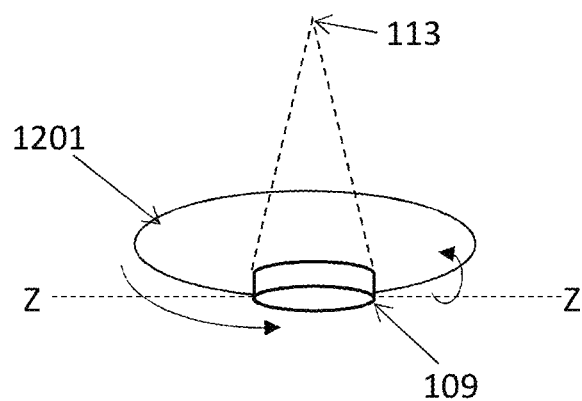
Figure 13C:
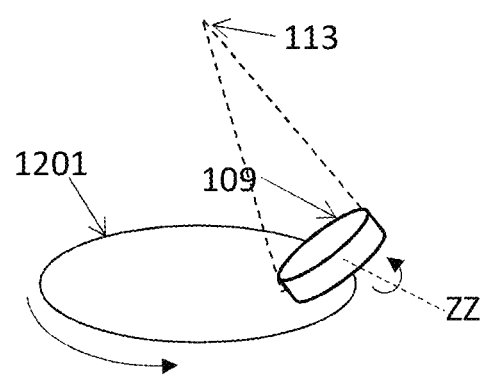

FIG. 13A illustrates revolving movements of the embodiment of FIG. 12 about a target point 113. As shown, the ultrasound transducer holder 109 is tilted about the axis ZZ to point towards a tissue target. FIG. 13B illustrates the embodiment of FIG. 12 after the turntable has spun a little. The ultrasound transducer holder 109 is still pointed towards a tissue target by being tilted about the same axis ZZ. This is because the axis ZZ revolves with the turntable. FIG. 13C illustrates the embodiment of FIG. 12 after the turntable has spun a little more. The ultrasound transducer holder 109 is still pointed towards a tissue target by being tilted about the same axis ZZ.

Accordingly, the embodiments afore-described include a robot base which provides for a translational movements within a plane, and at least one horizontal axis about which the ultrasound transducer holder 109 tilts. Other designs which provide for a combination of translation movements and tilting movements of the ultrasound transducer holder 109 is possible and are included within the contemplation of this description. In some situations, tilting the ultrasound transducer holder 109 provides easier focus of the ultrasound waves when the target point moves laterally on the treatment bed, than by changing the phase of the ultrasound transducers.

While the present invention has been particularly shown and described with reference to preferred embodiments thereof; it will be understood by those skilled in the art that various changes in form and details may be made therein without departing from the spirit and scope of the invention, and that the embodiments are merely illustrative of the invention, which is limited only by the appended claims. In particular, the foregoing detailed description illustrates the invention by way of example and not by way of limitation. The description enables one skilled in the art to make and use the present invention, and describes several embodiments, adaptations, variations, and method of uses of the present invention.

What is claimed is:

1. An MRI-guided focused ultrasound (FUS) positioning system that can focus ultrasound from a FUS transducer towards specific targets in a patient's body to induce micro-mechanical effects, said system including
an MRI-compatible robot platform that provides multiple degrees of freedom (DoFs) of motion, comprising:
a bottom framework;
a lower translation platform mounted on the bottom framework for linear motion with respect to the bottom framework;
a robot base mounted on the lower translation platform;
a rotation platform mounted on the robot base for rotational motion with respect to the robot base;
an upper translation platform mounted on the rotation platform for linear motion with respect to the rotation platform; and
an end-effector mounted on the upper translation platform such that motion of the end-effector is due to motion of the lower, rotation and upper platforms, in aiming the transducer focal point;
at least one actuator connected to the robot platform to cause the system to move according to at least one of its DoFs,
a FUS transducer provided on the end effector to generate ultrasound energy with a focal point, which transducer can be moved and steered electronically by adjusting the phase of the transducer or mechanically by moving the robot platform;
at least one marker embedded in the end-effector that provides signals that allow registration and tracking of the end-effector in the MRI coordinate system; and
a control system for remotely controlling the motions of the robot platform and for receiving intra-op MRI data, wherein the motion error is not greater than 0.2 mm in translation and 0.4° in rotation.

2. The positioning system of claim 1 wherein the MRI-compatible robot platform provides 5 DoFs of motion, and wherein:
the lower translation platform provides 2 DoFs linear motion in perpendicular directions with respect to the bottom framework;
the rotation platform provides 2 DoFs rotational motion in perpendicular directions with respect to the robot base; and
the upper translation platform provides 1 DoF linear motion with respect to the rotation platform.

3. The positioning system of claim 1 for directing focused ultrasound within the abdominal and pelvic cavities of the human body to treat abdominopelvic organ diseases.

4. The positioning system of claim 1 wherein the motion of the system caused by the at least one actuator is at least one of forward-backward, left-right, up-down, pan, and tilt.

5. The positioning system of claim 1 wherein the motion is driven by at least one of pneumatic and hydraulic actuation, causing zero electromagnetic (EM) interference, enhancing MR imaging quality and tracking performance of the marker(s).

6. The positioning system of claim 1 wherein the motion of the transducer is achieved using rolling-diaphragm-sealed hydraulic actuators.

7. The positioning system of claim 6 wherein the hydraulic actuation offers a high payload capability and high responsiveness even when the robot platform is immersed in liquid or supporting a liquid container on top of the transducer.

8. The positioning system of claim 1 wherein the robot platform is immersed and operated inside a tank of degassed liquid that couples the transducer to the patient body; and
the sealed tank with degassed liquid is integrated inside the MRI table.

9. The positioning system of claim 1 wherein the transducer couples to the patient body by an intermediate liquid container attached to a gel pad.

10. The positioning system of claim 1 wherein each DoF of the robot platform moves independently or simultaneously to achieve a remote center of motion (RCM) about the transducer focal point, reducing the exposure time of a particular skin region to ultrasound energy.

11. The positioning system of claim 1 wherein the workspace for transducer focal point mechanical steering is 100×100×35 mm or greater.

12. The positioning system of claim 1 wherein the control system utilizes the at least one marker to provide closed-loop control.

13. A method of treating a target in a patient's body to induce micro-mechanical effects inside the patient's body, comprising the steps of:
transmitting ultrasound from the FUS transducer as claimed in claim 1 into the body;
focusing the transmitted ultrasound onto the target;
moving the FUS transducer across the surface of the body while continuing to focus the transmitted ultrasound onto the target.

14. The method of treating a target in a patient's body to induce micro-mechanical effects inside the patient's body as claimed in claim 13, wherein
the step of moving the FUS transducer across the surface of the body comprises: moving the FUS transducer in a circular motion over the surface of the body.

15. The method of treating a target in a patient's body to induce micro-mechanical effects inside the patient's body as claimed in claim 13, wherein
the FUS transducer is tilted towards the target; and
the step of moving the FUS transducer across the surface of the body further comprises:
varying the tilt of the FUS transducer such that the FUS transducer is continuously adjusted to tilt towards the target as the FUS transducer is being moved across the surface of the body.

16. An MRI-guided focused ultrasound (FUS) positioning system that can focus ultrasound from a FUS transducer towards specific targets in a patient's body to induce micro-mechanical effects, said system including
an MRI-compatible robot platform that provides multiple degrees of freedom (DoFs) of motion, comprising:
a bottom framework;
a lower translation platform mounted on the bottom framework for linear motion with respect to the bottom framework;
a robot base mounted on the lower translation platform;
a rotation platform mounted on the robot base for rotational motion with respect to the robot base;
an upper translation platform mounted on the rotation platform for linear motion with respect to the rotation platform; and
an end-effector mounted on the upper translation platform such that motion of the end-effector is due to motion of the lower, rotation and upper platforms, in aiming the transducer focal point;
at least one actuator connected to the robot platform to cause the system to move according to at least one of its DoFs,
a FUS transducer provided on the end effector to generate ultrasound energy with a focal point, which transducer can be moved using rolling-diaphragm-sealed hydraulic actuators and steered electronically by adjusting the phase of the transducer or mechanically by moving the robot platform, wherein the bandwidth of the hydraulic actuation reaches 4.5 Hz, and a moving speed of 90 mm/s for each DoF of the upper and lower translation platform, allowing physiological motion compensation during treatment, reducing the operation time;
at least one marker embedded in the end-effector that provides signals that allow registration and tracking of the end-effector in the MRI coordinate system; and
a control system for remotely controlling the motions of the robot platform and for receiving intra-op MRI data.

17. An MRI-guided focused ultrasound (FUS) positioning system that can focus ultrasound from a FUS transducer towards specific targets in a patient's body to induce micro-mechanical effects, said system including
an MRI-compatible robot platform that provides multiple degrees of freedom (DoFs) of motion, comprising:
a bottom framework;
a lower translation platform mounted on the bottom framework for linear motion with respect to the bottom framework;
a robot base mounted on the lower translation platform;
a rotation platform mounted on the robot base for rotational motion with respect to the robot base;
an upper translation platform mounted on the rotation platform for linear motion with respect to the rotation platform; and
an end-effector mounted on the upper translation platform such that motion of the end-effector is due to motion of the lower, rotation and upper platforms, in aiming the transducer focal point;
at least one actuator connected to the robot platform to cause the system to move according to at least one of its DoFs,
a FUS transducer provided on the end effector to generate ultrasound energy with a focal point, which transducer can be steered electronically by adjusting the phase of the transducer or mechanically by moving the robot platform;
at least one marker embedded in the end-effector that provides signals that allow registration and tracking of the end-effector in the MRI coordinate system; and
a control system for remotely controlling the motions of the robot platform and for receiving intra-op MRI data;
wherein the stroke of each DoF of the upper and lower translation platforms is ±35 mm, and the stroke for each DoF of the rotation platform is ±60°.

18. An MRI-compatible robot platform that provides multiple degrees of freedom (DoFs) of motion, comprising:
- a bottom framework;
- a lower translation platform mounted on the bottom framework for linear motion with respect to the bottom framework;
- a robot base mounted on the lower translation platform;
- a rotation platform mounted on the robot base for rotational motion with respect to the robot base;
- an upper translation platform mounted on the rotation platform for linear motion with respect to the rotation platform; and
- an end-effector mounted on the upper translation platform such that motion of the end-effector is due to motion of the lower, rotation and upper platforms, in aiming the transducer focal point;
- a FUS transducer provided on the end effector to generate ultrasound energy with a focal point, and motion of the end effector results in aiming the transducer focal point;
- at least one marker embedded in the end-effector that provides signals that allow registration and tracking of the location of the end-effector; and
- wherein the robot platform is adapted to receive a signal for at least one actuator that causes the platform to move according to at least one of its DoFs, wherein the motion error is not greater than 0.2 mm in translation and 0.4° in rotation.

19. The robot platform of claim 18 wherein the MRI-compatible robot platform provides 5 DoFs of motion, and wherein:
- the lower translation platform provides 2 DoFs linear motion in perpendicular directions with respect to the bottom framework;
- the rotation platform provides 2 DoFs rotational motion in perpendicular directions with respect to the robot base; and
- the upper translation platform provides 1 DoF linear motion with respect to the rotation platform.

* * * * *